(12) United States Patent
Matsumoto

(10) Patent No.: US 10,989,986 B2
(45) Date of Patent: Apr. 27, 2021

(54) SHUTTER UNIT AND IMAGING APPARATUS

(71) Applicant: CANON KABUSHIKI KAISHA, Tokyo (JP)

(72) Inventor: Yoshiyuki Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/717,523

(22) Filed: Dec. 17, 2019

(65) Prior Publication Data

US 2020/0201141 A1 Jun. 25, 2020

(30) Foreign Application Priority Data

Dec. 21, 2018 (JP) .............................. JP2018-238999

(51) Int. Cl.
*G03B 9/10* (2021.01)
*G03B 9/20* (2021.01)

(52) U.S. Cl.
CPC ....... *G03B 9/10* (2013.01); *G03B 9/20* (2013.01)

(58) Field of Classification Search
CPC ..... G03B 9/10; G03B 9/16; G03B 9/20; G03B 9/36
USPC ........................................................ 396/489
See application file for complete search history.

(56) References Cited

U.S. PATENT DOCUMENTS

| | | | | |
|---|---|---|---|---|
| 3,277,806 A | * | 10/1966 | Wagner | G03B 9/42 396/489 |
| 2010/0054727 A1 | * | 3/2010 | Okutani | G03B 9/66 396/466 |
| 2018/0054560 A1 | * | 2/2018 | Karibe | H04N 5/2353 |
| 2019/0004398 A1 | * | 1/2019 | Ishibiki | G03B 9/10 |
| 2020/0201142 A1 | * | 6/2020 | Adachi | H04N 5/2254 |

FOREIGN PATENT DOCUMENTS

JP 2011-113060 A 6/2011

* cited by examiner

*Primary Examiner* — Christopher E Mahoney
(74) *Attorney, Agent, or Firm* — Cowan, Liebowitz & Latman, P.C.

(57) ABSTRACT

A shutter unit includes a base plate, a first blade operation member movable integrally with the first blade member between a first movement completion position and a first movement start position, a second blade operation member movable integrally with the second blade member between a second movement completion position and a second movement start position, a first charge member configured to charge the first blade operation member from the first movement completion position to the first movement start position, and a second charge member configured to charge the second blade operation member from the second movement completion position to the second movement start position, wherein the first charge member and the second charge member include coaxially arranged cam gears and are configured to rotate in opposite directions.

9 Claims, 24 Drawing Sheets

SHUTTER UNIT AND IMAGING APPARATUS

BACKGROUND OF THE INVENTION

Field of the Invention

The present invention relates to a shutter unit and an imaging apparatus having the same.

Description of the Related Art

A focal plane shutter has conventionally been used in an imaging apparatus such as a digital single-lens reflex camera or a mirrorless (non-reflex) camera. Japanese Patent Application Laid-Open No. ("JP") 2011-113060 discloses a focal plane shutter comprising a locking member that can lock a member interlocked with a blade out of two blade drive members at an exposure operation end position, and configured to set, in a set state, a state for closing an aperture or a state for retreating from the aperture. In such a shutter, a forcing unit to apply a force between the two blade drive members is often replaced with a backlash elimination spring. Further, a front blade drive member and a rear blade drive member are often charged by the same unit.

A camera often performs image sensor reading during a shutter charge. At this time, for charging while keeping the aperture closed not to expose the image sensor, it is necessary to start charging the rear blade drive member after the front blade drive member starts charging. However, the focal plane shutter disclosed in JP 2011-113060 charges the front blade drive member and the rear blade drive member by the same unit, and thus it is difficult to secure a sufficient overlap amount between the front blade and the rear blade. For example, as illustrated in FIG. 28, while a rotation amount or a linear movement amount for charging is constant, charging of the front blade drive member is started in advance, therefore a charge section of the rear blade drive member is smaller than the charge section of the front blade drive member. Namely, if the overlap amount between the front blade and the rear blade is increased, the rear blade drive member must be charged in a short section. As a result, a charge load is concentrated in a specific range, and a charge efficiency tends to decrease. Further, since the rear blade drive member is likely to rotate during a set release, the rear blade shake after the set release is likely to continue. Therefore, a longer time is required for one sequence, leading to a reduction of a frame rate.

SUMMARY OF THE INVENTION

The present invention provides a shutter apparatus configured to sufficiently secure an amount of overlap between a front blade and a rear blade, and an imaging apparatus including the shutter apparatus.

A shutter unit as one aspect of the present invention includes a base plate having an aperture and to which a first blade member and a second blade member are rotatably attached, a first blade operation member movable integrally with the first blade member between a first movement completion position that provides a retreat state where the first blade member retreats from the aperture, and a first movement start position that provides a closed state where the first blade member closes the aperture, a second blade operation member movable integrally with the second blade member between a second movement completion position that provides a closed state where the second blade member closes the aperture, and a second movement start position that provides a retreat position where the second blade member retreats from the aperture, a first charge member configured to charge the first blade operation member from the first movement completion position to the first movement start position, and a second charge member configured to charge the second blade operation member from the second movement completion position to the second movement start position. The first charge member and the second charge member include coaxially arranged cam gears and are configured to rotate in opposite directions. An imaging apparatus having the above shutter apparatus also constitutes another aspect of the present invention.

Further features of the present invention will become apparent from the following description of exemplary embodiments with reference to the attached drawings.

DESCRIPTION OF THE EMBODIMENTS

Figure 1A:
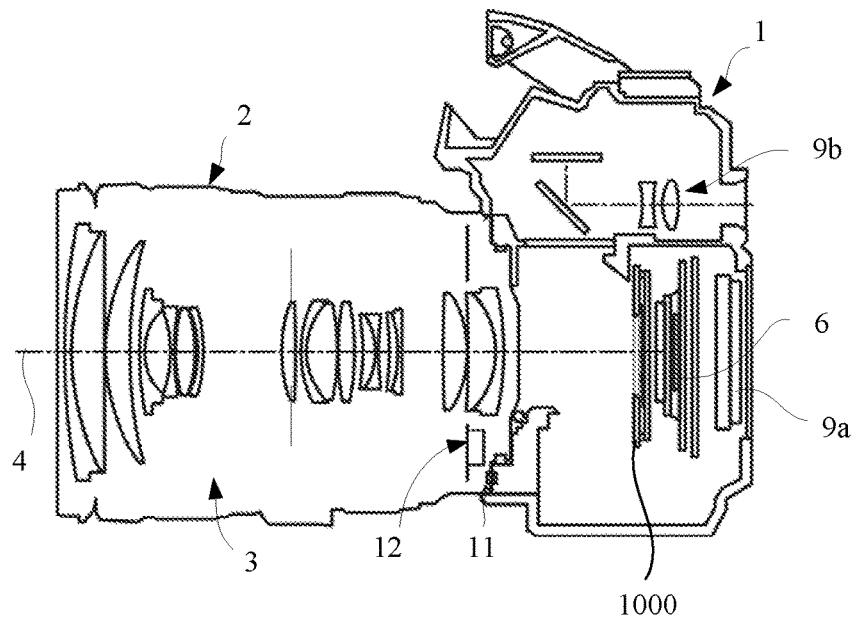
FIGS. 1A and 1B explain a structure of an imaging apparatus according to an embodiment of the invention.

Referring now to the accompanying drawings, a description will be given of embodiments according to the present invention. Corresponding elements in respective figures will be designated by the same reference numerals, and a description thereof will be omitted.

Figure 1B:
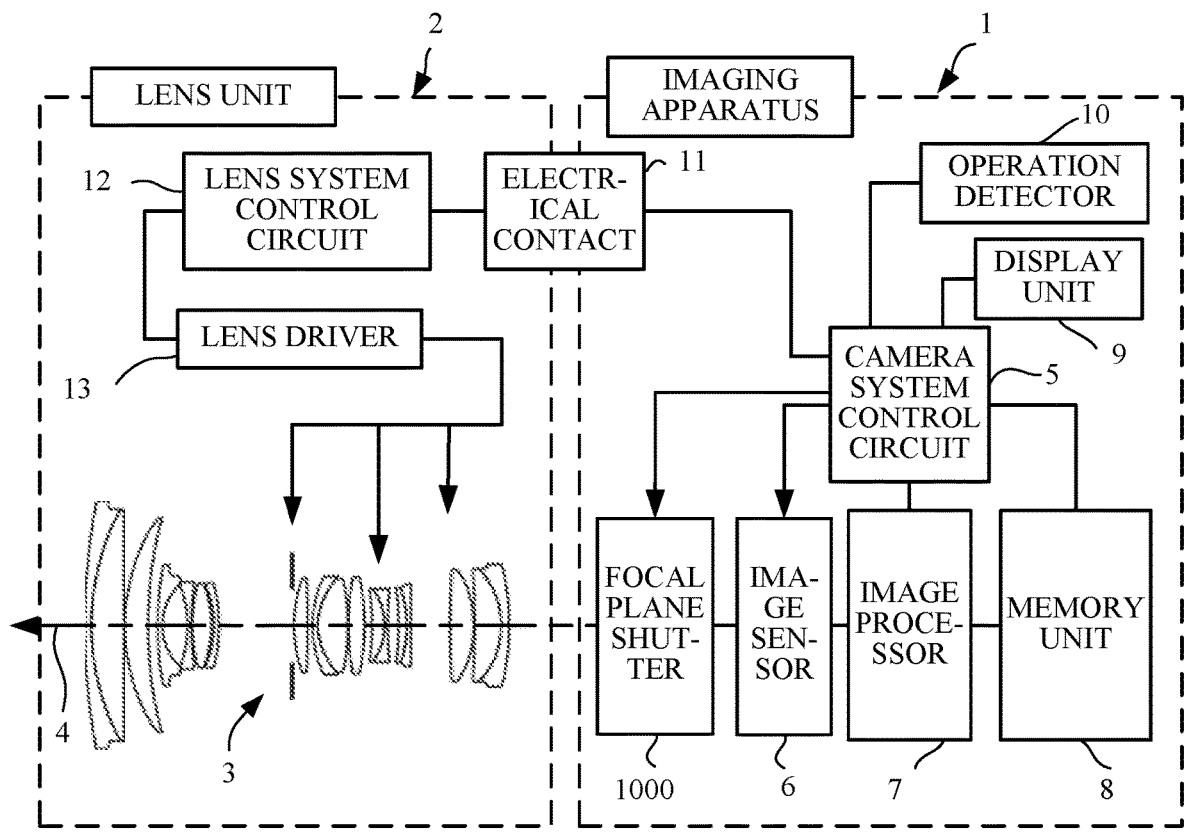

FIGS. 1A and 1B illustrate a configuration of a lens interchangeable type imaging apparatus (camera system) that is an illustrative imaging apparatus according to an embodiment of the present invention. FIG. 1A is a central sectional view of the lens interchangeable type imaging apparatus. FIG. 1B is a block diagram illustrating an electrical configuration of the lens interchangeable type imaging apparatus.

The lens interchangeable type imaging apparatus 1 includes an imaging apparatus and a lens unit 2 attachable to an imaging apparatus 1. The imaging apparatus 1 and the lens unit 2 are electrically connected via an electrical contact 11 and communicate with each other. Still images and motion images can be taken when an operation of each unit of the imaging apparatus 1 is controlled in accordance with a user operation on an operation detector 10.

The lens interchangeable type imaging apparatus includes an imaging unit, an image processing unit, a recording/reproducing unit, and a control unit. The imaging unit includes an imaging optical system 3 provided with a plurality of lenses, an image sensor 6, and a focal plane shutter (a shutter unit; hereinafter referred to as a shutter) 1000. Reference numeral 4 in the figure is an optical axis of the imaging optical system 3. The image processing unit includes an image processor 7. The recording/reproducing unit includes a memory unit 8 and a display unit 9. The display unit 9 includes a rear display device 9a and an EVF 9b. The rear display device 9a is a touch panel and is connected to the operation detector 10. The control unit includes a camera system control circuit 5, an operation detector 10, a lens system control circuit 12, and a lens driver 13. The lens driver 13 can drive a focus lens, an image stabilization lens, a diaphragm (aperture stop), and the like included in the imaging optical system 3.

The imaging unit is an optical processing system that forms an image of light from an object on the imaging plane of the image sensor 6 via the imaging optical system 3. The imaging optical system 3 is appropriately adjusted based on a focus evaluation amount and an appropriate exposure amount obtained from the image sensor 6. As a result, the image sensor 6 is exposed with an appropriate amount of object light, and an object image is formed near the image sensor 6. The shutter 1000 controls the exposure amount of the image sensor 6 by moving a front shutter curtain (first blade member) 700 and a rear shutter curtain (second blade member) 800 described later.

The image processor 7 includes an A/D converter, a white balance adjustment circuit, a gamma correction circuit, an interpolation calculation circuit, and the like, and generates an image for recording. The image processor 7 includes a color interpolation processing unit, and performs color interpolation (demosaicing) processing from the Bayer array signal to generate a color image. In addition, the image processor 7 compresses still images, motion images, sounds, and the like using a predetermined method.

The memory unit 8 includes a storage unit. The camera system control circuit 5 performs an output to the storage unit of the memory unit 8 and displays an image to be presented to a user on the display unit 9.

The camera system control circuit 5 generates and outputs a timing signal at the time of imaging. The camera system control circuit 5 controls the imaging unit, the image processor, and the recording/reproducing unit in response to an external operation. For example, when the operation detector 10 detects that a shutter release button (not illustrated) is pressed, the camera system control circuit 5 controls driving of the image sensor 6, an operation of the image processor 7, compression processing, and the like. Further, the camera system control circuit 5 controls an information display device that displays information from the display unit 9.

The camera system control circuit 5 calculates an appropriate focus position and an aperture value (F-number) based on a signal from the image sensor 6. Namely, the camera system control circuit 5 performs a light metering operation and a focus detecting operation based on a signal from the image sensor 6 and determines an exposure condition (such as an F-number and a shutter speed). The camera system control circuit 5 issues a command to the lens system control circuit 12 via the electrical contact 11, and the lens system control circuit 12 appropriately controls the lens driver 13.

Figure 2:
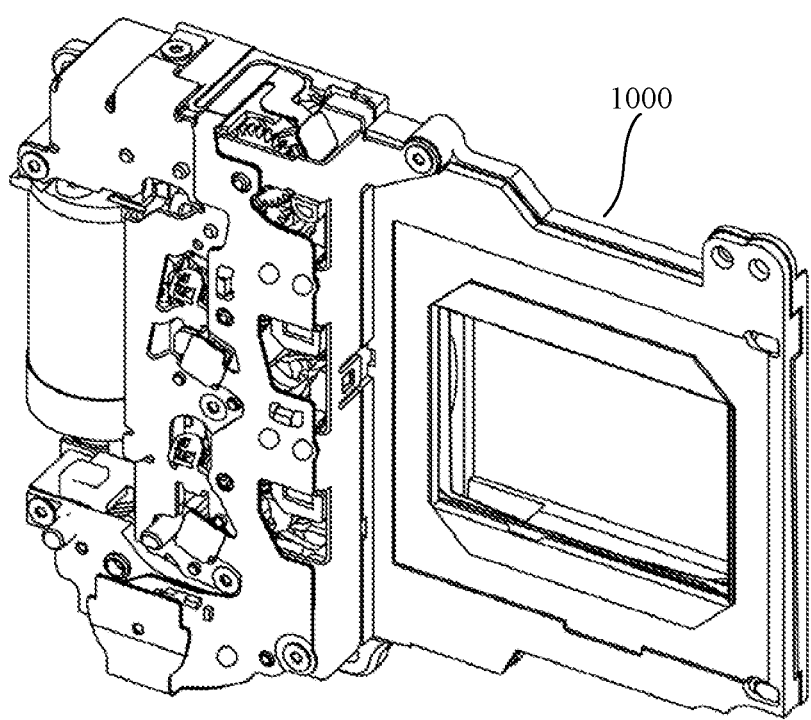
FIG. 2 is a perspective view of a focal plane shutter.
Figure 3:
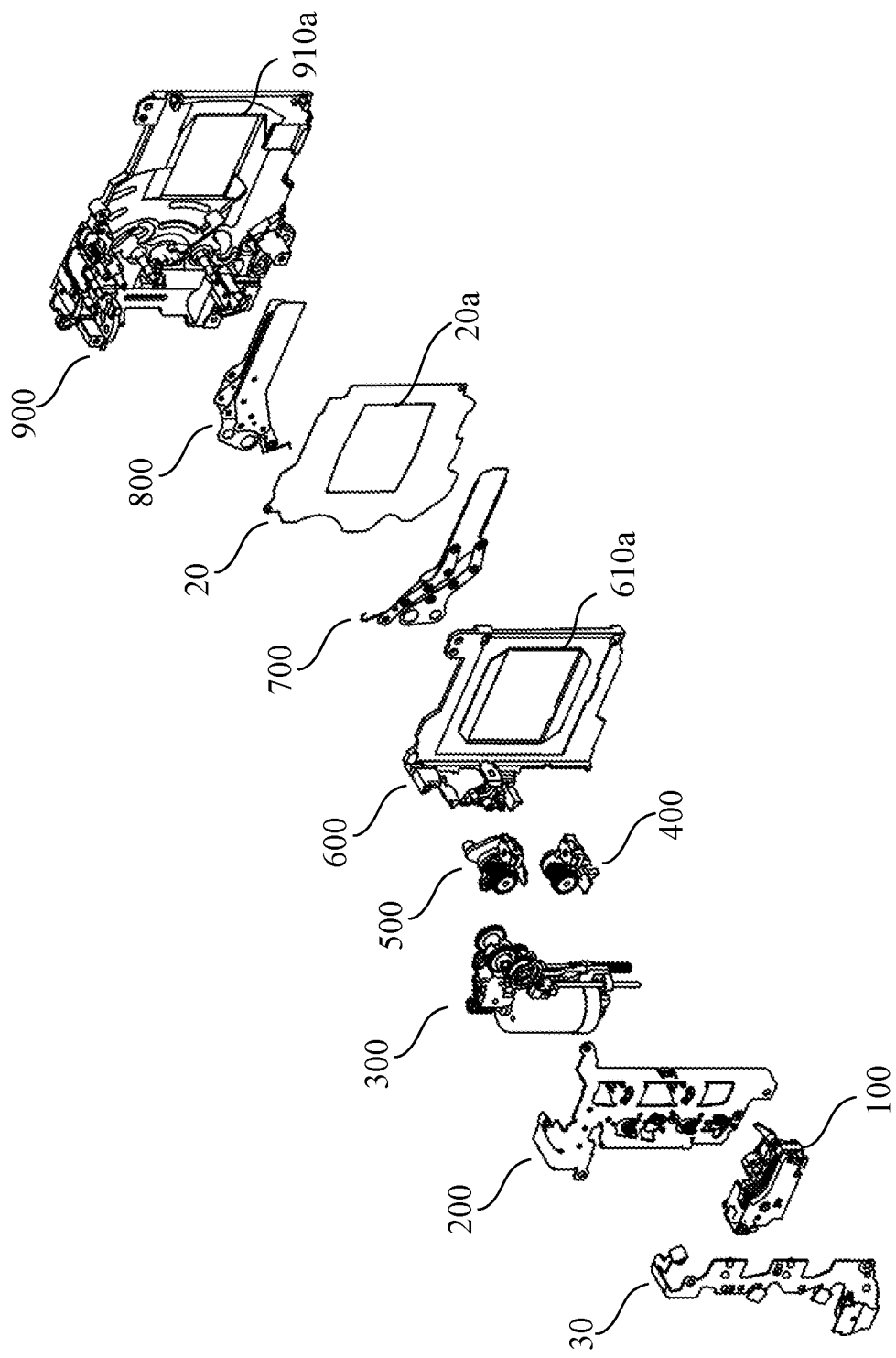
FIG. 3 is an exploded perspective view of a focal plane shutter.

FIG. 2 is a perspective view of the shutter 1000. FIG. 3 is an exploded perspective view of the shutter 1000. The shutter 1000 includes a base plate unit 900. Each component is mounted on the base plate unit 900

The base plate unit 900 and a partition plate 20 form a movement space for the rear shutter curtain 800. A cover plate unit 600 and the partition plate 20 form a movement space for the front shutter curtain 700. An aperture 910a is formed in the base plate unit 900. An aperture 20a and an aperture 610a overlapping with the aperture 910a, are formed in a partition plate 20 and a cover plate unit 600, respectively. During imaging, a light beam transmitted through the lens unit 2 passes the aperture 910a, the aperture 20a and the aperture 610a sequentially and exposes the image sensor 6. In the following description, "aperture" refers to an overlapping of the apertures 20a, 610a, and 910a.

A flexible board 30, an actuator unit 100, an MG base plate unit 200, a charge system component group 300, a front drive lever unit 400 and a rear drive lever unit 500 are mounted on the base plate unit 900. As described later, the front drive lever unit 400 comprises a front drive lever (a second drive member) 410 and a front blade lever (a first drive member) 420.

Figure 4:
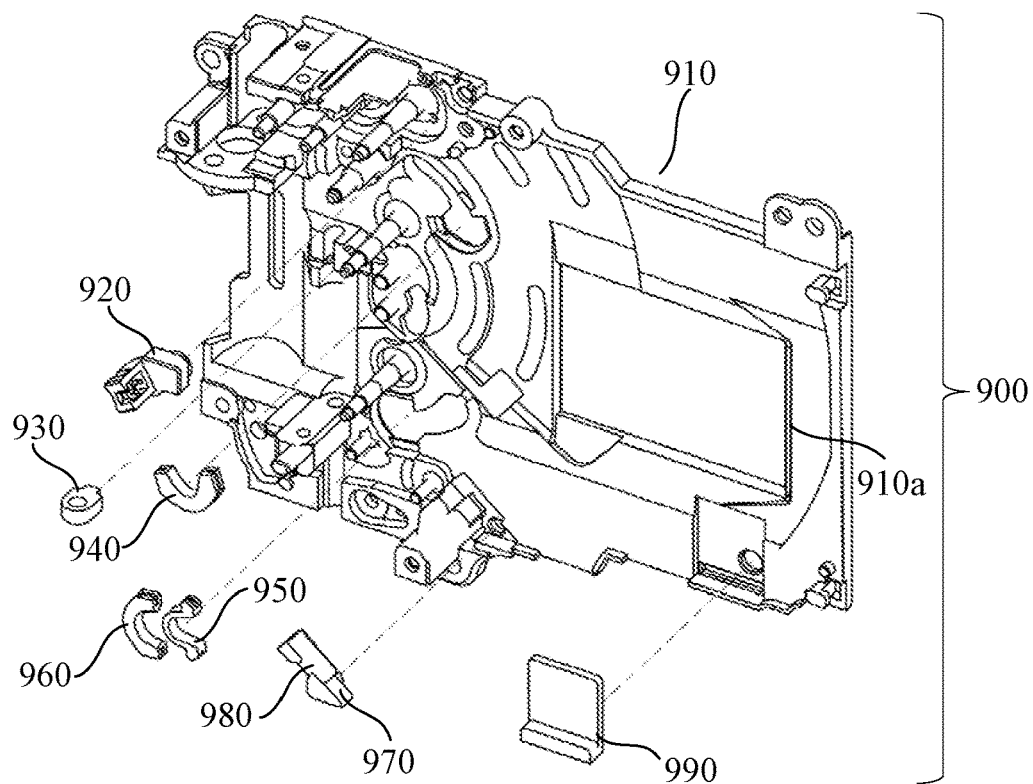
FIG. 4 is an exploded perspective view of a base plate unit.

FIG. 4 is an exploded perspective view of the base plate unit 900. A group of small components are incorporated in the base plate 910. A phase detection photo interrupter unit (a phase detector unit) 920 detects a phase of a front curtain charge cam gear 317 described later. A slide lever shock-absorbing member 930 buffers a shock when a slide lever 330 described later is operated by a spring. A half-moon rubber 940 is used as a shock-absorbing member of the rear drive lever unit 500. A rubber cover 950 and a half-moon cover 960 are combined and used as a shock-absorbing member of the front drive lever unit 400. The rubber cover 950 is less adhesive than the half-moon rubber 960, and arranged so that the front blade lever 420 can easily follow the front drive lever 410 at the charge start timing. An arm rubber 970 is used to buffer a shock when the front shutter curtain 700 completes a movement. An arm rubber cover 980 is used to protect a surface of the arm rubber 970 such as preventing adhesion of dust. A blade tip rubber 990 is used to buffer a shock when the front shutter curtain 700 and the rear shutter curtain 800 completed a movement.

Figure 5:
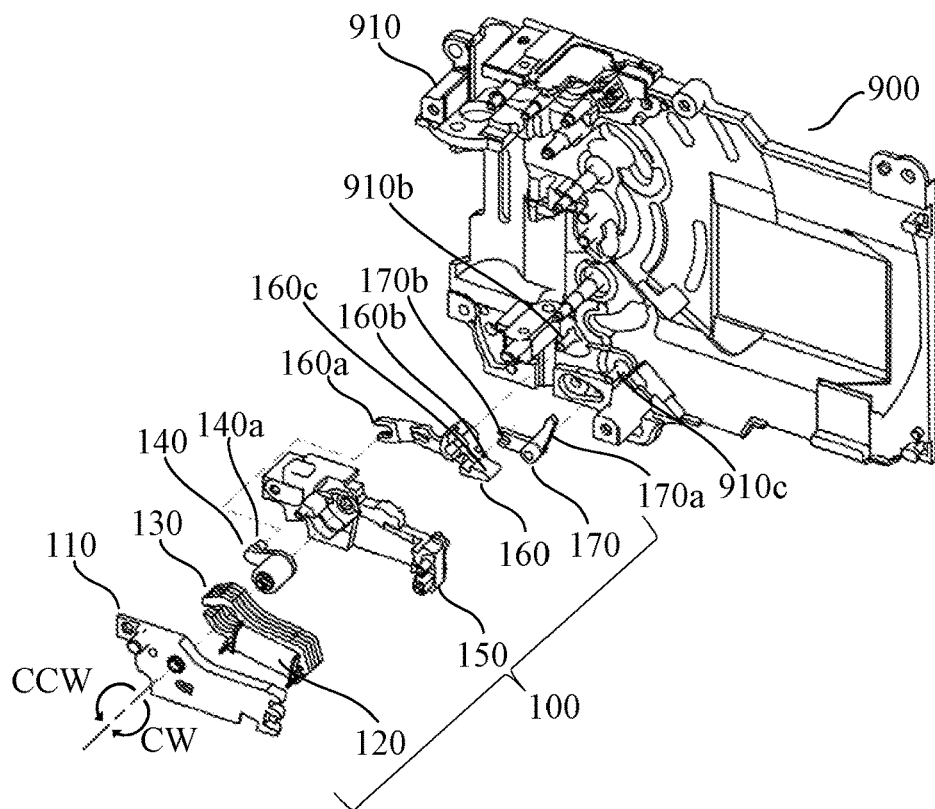
FIG. 5 is an exploded perspective view of an actuator unit.

FIG. 5 is an exploded perspective view of the actuator unit 100. An actuator cover 110 covers an actuator coil 120, and actuator yoke 130 and a rotor 140 to prevent dust from entering, and holds the rotor 140 rotatably with an actuator base 150. The actuator coil 120 provides a rotational force to the rotor 140 via the actuator yoke 130. A first lock lever 160 is rotatably supported by a first lock lever rotary shaft 910b of the base plate 910. A second lock lever 170 is rotatably supported by a second lock lever rotary shaft 910c of the base plate 910. An operated portion 160a of the first lock lever 160 is engaged with the rotor operation portion 140a of the rotor 140. A locking portion 160b of the first lock lever 160 is engaged with a locked portion 170b of the second lock lever 170. A locking portion 160c of the first lock lever 160 can lock a locked portion 420c of a front blade lever 420 described later. A locking portion 170a of the second lock lever 170 can lock a locked portion 420d of the front blade lever 420 described later. The first lock lever 160 and the second lock lever 170 move in conjunction with an operation of the rotor 140 by energizing the actuator coil 120. More specifically, when the first lock lever 160 is located inside a drive region of the front blade lever 420 (a position where the front blade lever can be locked), the second lock lever 170 is located outside the drive region of the front blade lever 420. Further, when the second lock lever 170 is located inside the drive region of the front blade lever 420 (a position where the front blade lever 420 can be locked), the first lock lever 160 is located outside the drive region of the front blade lever 420.

Figure 6:
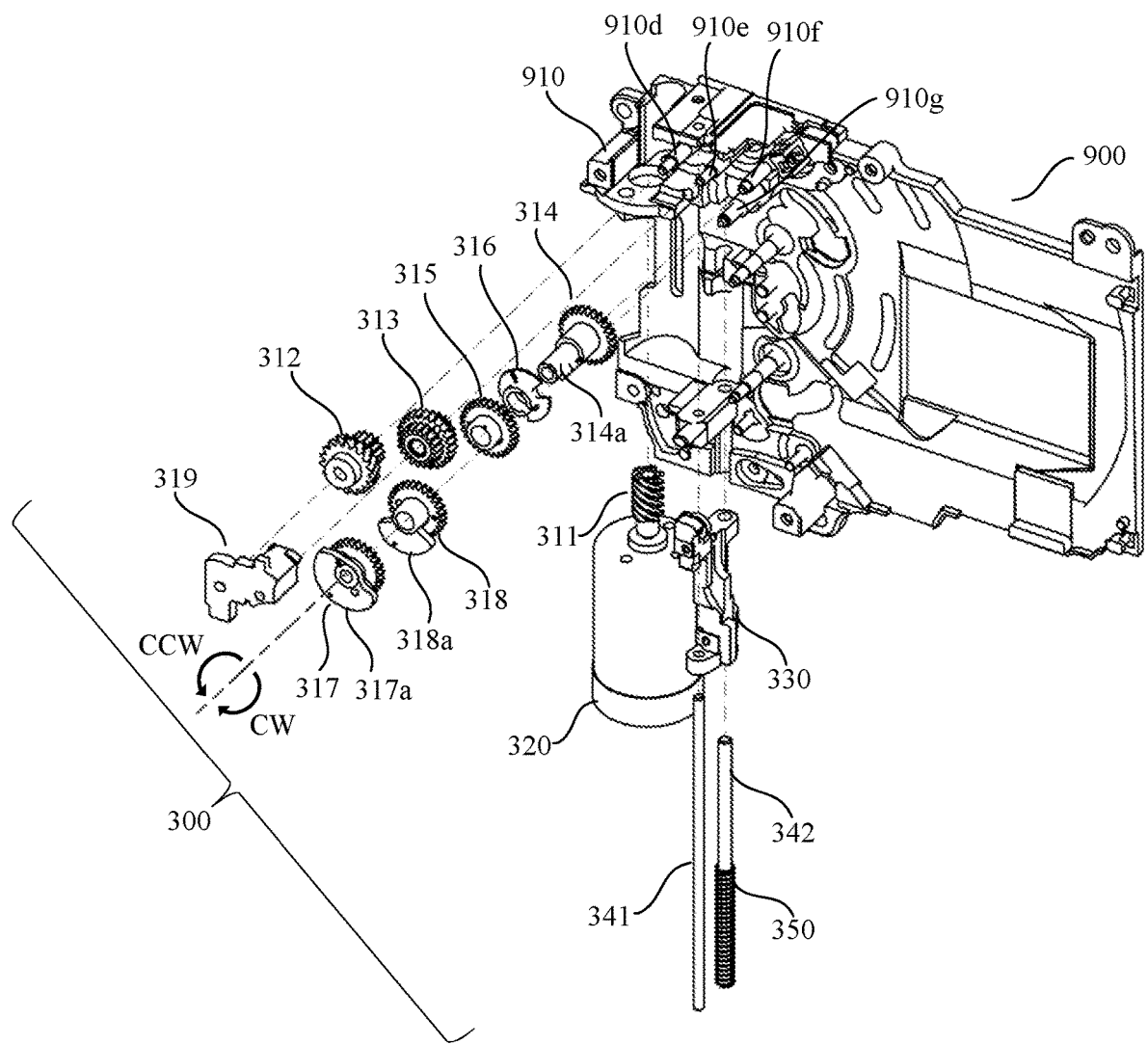
FIG. 6 illustrates how to assemble a charging component unit onto a base plate.
Figure 7C:
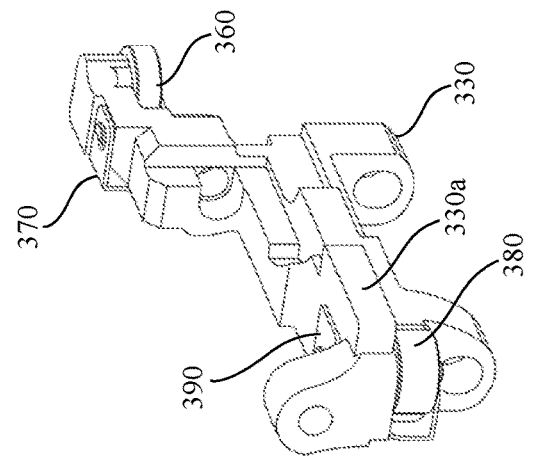
FIGS. 7A to 7C show a positional relationship between a slide lever and its peripheral parts.
Figure 7A:
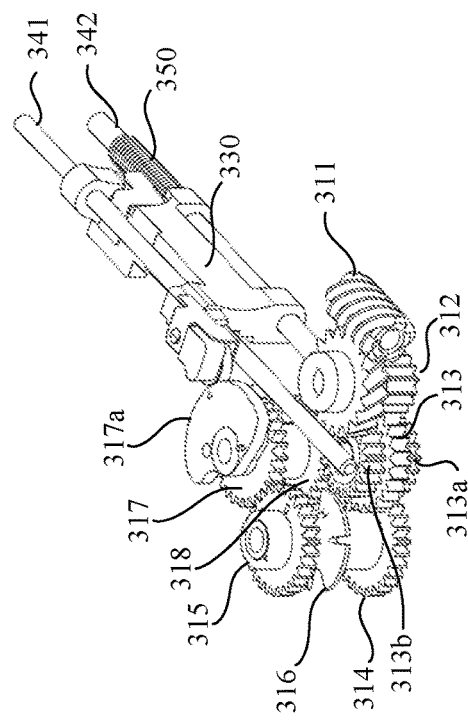
Figure 7B:
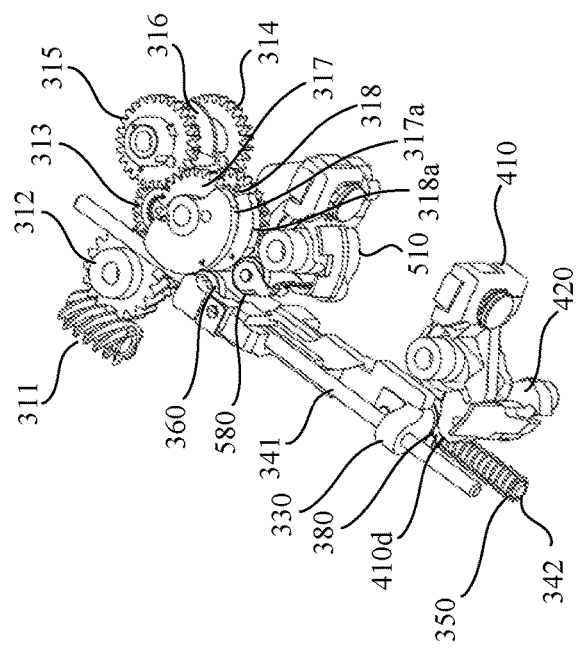

FIG. 6 illustrates how to assemble a charging component unit 300 onto the base plate 910. FIGS. 7A to 7C illustrate a positional relationship between the slide lever 330 and its peripheral parts. FIG. 7A illustrates the slide lever 330 and its peripheral parts viewed from an upper side. FIG. 7B illustrates the slide lever 330 and its peripheral parts viewed from a downward side. FIG. 7C is a perspective view of the slide lever 330. A charge refers to an operation of transmitting a power of a motor 320 to the front drive lever unit 400 and the rear drive lever unit 500 via gears or the like and returning each lever unit from a movement completion position to a movement start position against a spring force. A pinion gear 311 is attached to the motor 320, and a torque generated by the motor 320 is transmitted to a gear group via the pinion gear 311. A first gear 312 is rotatably supported by a first gear shaft 910d of the base plate 910, and engaged with the pinion gear 311. A second gear (a third drive member) 313 is rotatably supported by a second gear shaft 910e of the base plate 910 and engaged with a first gear 312. The first gear 312 and the second gear 313 are covered with a gear cover 319 so as not to bounce out in the thrust direction.

The second gear 313 includes two small gears 313a and 313b. The small gear 313a is connected to an idle gear 314. The idle gear 314 includes an engaging portion 314a which is engaged with an idle gear 115 and a phase plate 316, and is rotatably supported by an idle gear shaft 910f of the base plate 910. The idle gear 314, the idle gear 315 and the phase plate 316 are integrally rotatable, and constitute a second drive member in this embodiment. The idle gear 315 is connected to a front curtain charge cam gear (a first charge member) 317. A cam 317a of the front curtain charge cam gear 317 drives the slide lever 330 in a guide direction by shafts 341 and 342, so that the front curtain charge cam gear 317 can charge the front drive lever 410 indirectly. Namely, the slide lever 330 functions as a transmission member which can transmit a force from the front curtain charge cam gear 317 to the front drive lever 410. A small gear 313b is connected to a rear curtain charge cam gear (a second charge member) 318. The rear curtain charge cam gear 318 is configured to charge a rear drive lever 510 directly. Both the front curtain charge cam gear 317 and the rear curtain charge cam gear 318 are rotatably supported by a cam gear shaft 910g of the base plate 910, and rotate in directions opposite to each other. In the embodiment, a charge is performed by the slide lever 330 in a front curtain charge, and a charge is performed by the rear curtain charge cam gear 318 instead of the slide lever 330 in a rear curtain charge.

The slide lever 330 is held so as to be movable in a direction guided by the shafts 341 and 342 fixed to the base plate 910. A roller 360 is rotatably held by the slide lever 330 and functions as a cam follower of a cam 317a. A roller cover 370 holds the roller 360 so as not to drop it off from the slide lever 330. The roller 380 is rotatably held by the slide lever 330 and pushes the front drive lever 410. A roller cover 390 holds the roller 380 so as not to drop it off from the slide lever 330. The slide lever 330 moves in a direction away from the gear group by the torque of the motor 320, and moves in a direction approaching to the gear group by a slide lever return spring 350. When the slide lever 330 moves in a direction away from the gear group, a cam portion 330a provided on the slide lever 330 releases an engagement of a rear curtain bound lock lever 620 described later.

In this embodiment, a gear connection path from the second gear 313 is divided, and a charge path is made different between a front curtain charge and a rear curtain charge path. Consequently, a rear curtain charge can follow a front curtain charge. Also, since the number of the gears which is required for the rear curtain charge is less than the number of the gears which is required for the front curtain charge, the rear curtain charge has a gear efficiency higher than that where the front curtain charge and the rear curtain charge are performed by a single slide lever.

Figure 8:
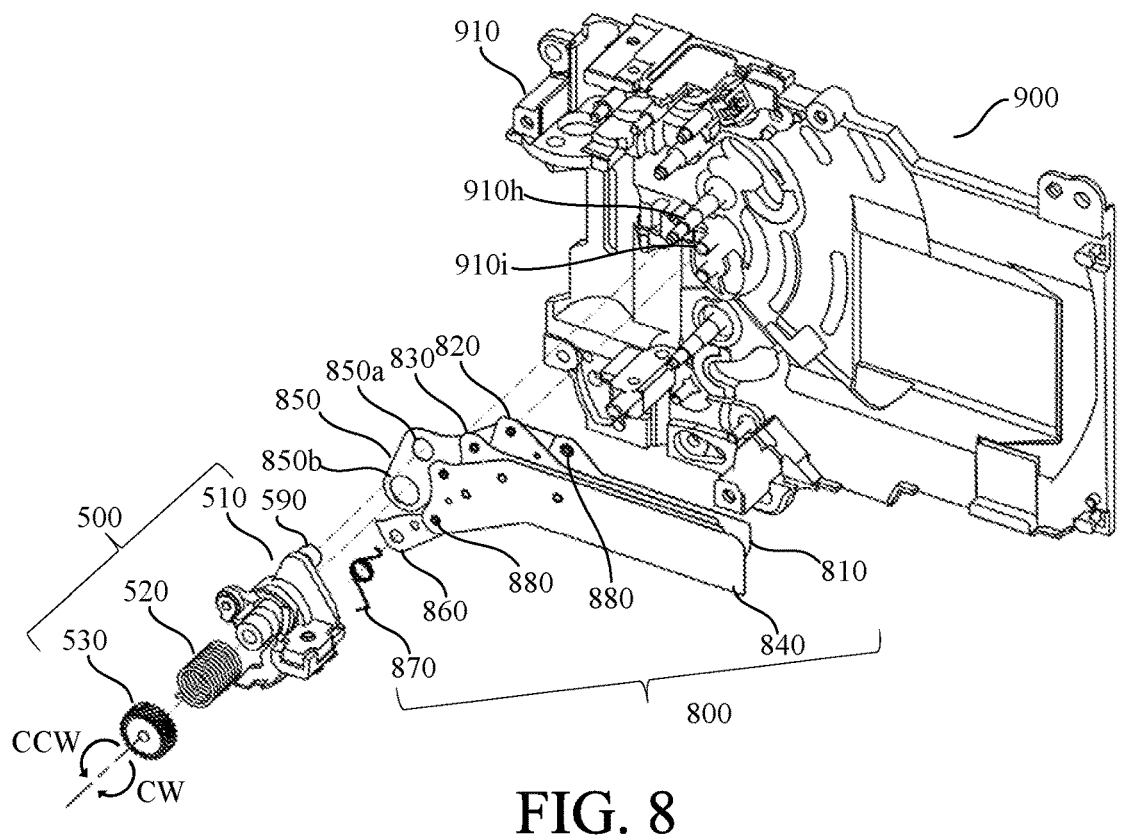
FIG. 8 is an explanatory diagram of a rear drive lever and a rear shutter curtain.

FIG. 8 is an explanatory diagram of a rear drive lever unit (a second blade operation member) 500 and a rear shutter curtain 800. The rear drive lever 510 is pivotally supported on a rear drive shaft 910h reciprocally and rotatably. A rear sub arm 860 is pivotally supported by a rear sub arm shaft 910i reciprocally and rotatably. The rear drive lever 510 is engaged with an engagement portion 850b at a rotation center so as to be integrally operable with a rear main arm 850. A rear drive pin 510b described later which is engaged with a rear drive pin cover 590 is provided at a portion away from the rotation center of the rear drive lever 510 by a predetermined distance, and engaged with an engagement portion 850a. The rear drive pin 510b is protected by a drive pin cover 590 described later. In the rear shutter curtain 800, the rear main arm 850, the rear sub arm 860, a rear first blade 810, a rear second blade 820, a rear third blade 830 and a rear fourth blade 840 form a parallel link. Each blade and each arm are pivotally supported by a blade caulking dowel 880. A rear backlash elimination spring 870 is a spring to eliminate a backlash between the rear drive lever unit 500 and the rear shutter curtain 800, and forces the rear shutter curtain 800 counterclockwise. A main spring 520 is a torsion spring configured to operate the rear drive lever unit 500 and the rear shutter curtain 800, and forces the rear shutter curtain 800 clockwise. By incorporating a fixed end of the main spring 520 into an adjuster gear 530, a spring force is adjustable by an adjuster worm 260 described later.

Figure 9:
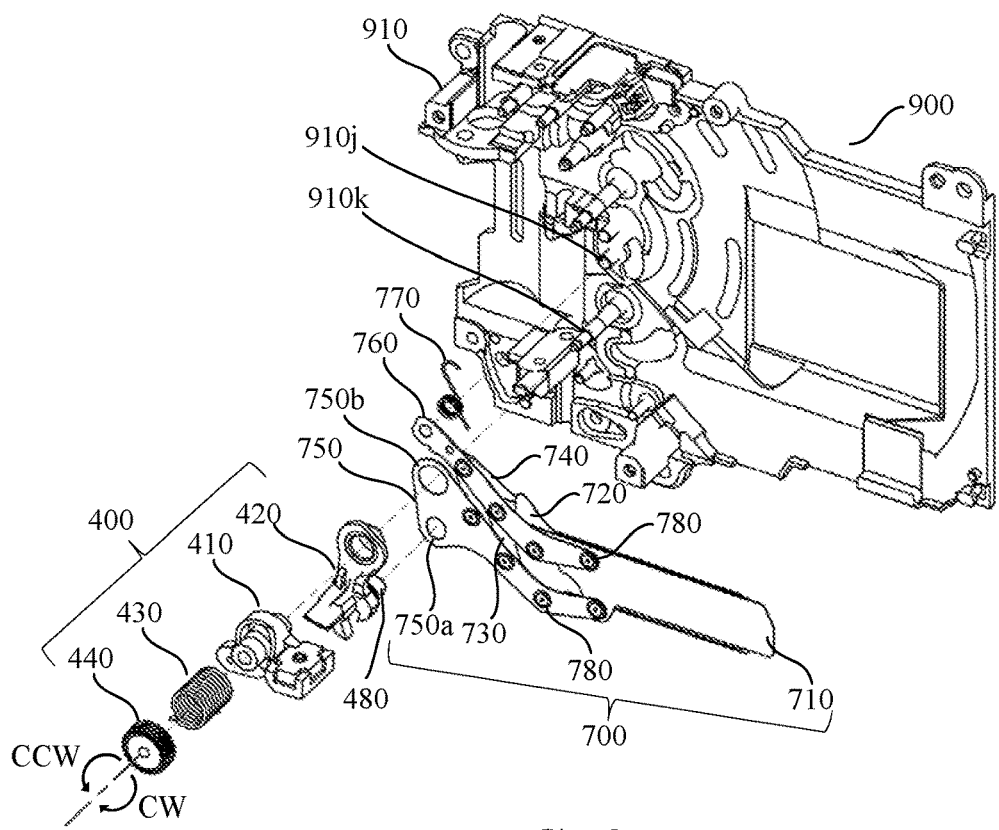
FIG. 9 is an explanatory diagram of a front drive lever and a front shutter curtain.

FIG. 9 is an explanatory diagram of the front drive lever unit (a first blade operation member) 400 and the front shutter curtain 700. The front drive lever 410 is pivotally supported by a front drive shaft 910k so as to be capable of reciprocating rotation. A front sub arm 760 is pivotally supported by a front sub arm 910j reciprocally and rotatably. The front drive lever 410 is engaged with an engagement portion 750b at a rotation center so as to integrally operate with a front main arm 750. A drive pin 420b of the front blade lever 420, described later, is provided at a portion away from the rotation center of the front blade lever 420 by a predetermined distance, and is engaged with an engagement portion 750a. The drive pin 420b is protected by a drive pin cover 480 described later. In the front shutter curtain 700, the front main arm 750, the front sub arm 760, a first front blade 710, a second front blade 720, a third front blade 730 and a fourth front blade 740 form a parallel link. Each blade and each arm are pivotally supported by a blade caulking dowel 780. A front backlash elimination spring 770 is a spring to eliminate a backlash between the front drive lever unit 400 and the front shutter curtain 700, and forces the front shutter curtain 700 counterclockwise. Further, the backlash elimination spring 770 forces the front blade lever 420 toward the front drive lever 410 via the front shutter curtain 700. A main spring 430 is a torsion spring to operate the front drive lever unit 400 and the front shutter curtain 700, and forces the front shutter curtain 700 clockwise. As the fixed end of the main spring 430 is fixed into an adjuster gear 440, a spring force is adjustable by an adjuster worm 260 described later.

Figure 10:
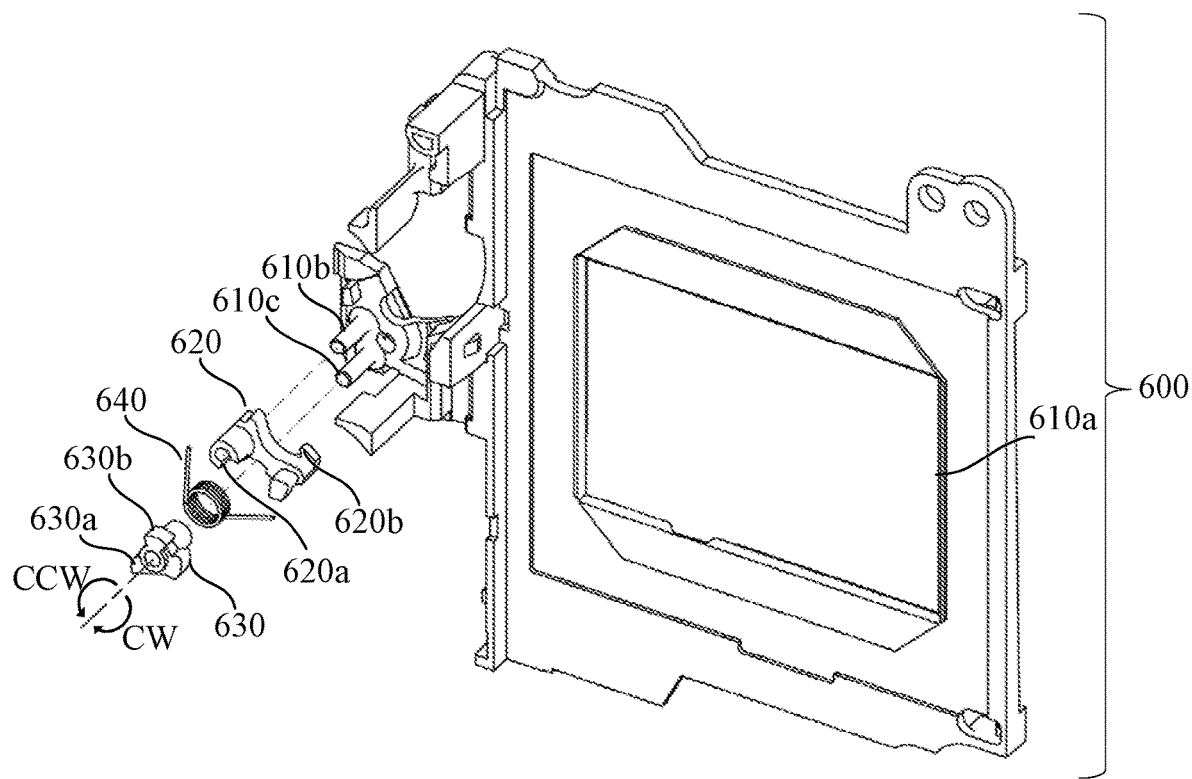
FIG. 10 is an exploded perspective view of a cover plate unit.

FIG. 10 is an exploded perspective view of a cover plate unit 600. The rear curtain bound lock lever 620 is pivotally supported on a rear curtain bound lock lever shaft 610b, and prevents re-exposing which occurs from a bounce during a movement of the rear curtain. A bound lock spring 640 rotates the rear curtain bound lock lever 620 to a position at which the rear drive lever 510 is locked, after a locking portion 620b of the rear curtain bound lock lever 620 is pushed aside by a locked portion 510a of the rear drive lever 510, described later. A bound lock release lever 630 is pivotally supported by a bound lock release lever shaft 610c, and rotates counterclockwise in conjunction with a charge start operation of the slide lever 330. As the bound lock release lever 630 rotates, an operation portion 630b affects an operated portion 620a of the rear curtain bound lock lever 620 and rotates the rear curtain bound lock lever 620 clockwise to retreat to the position where the rear drive lever 510 is not locked.

Figure 11:
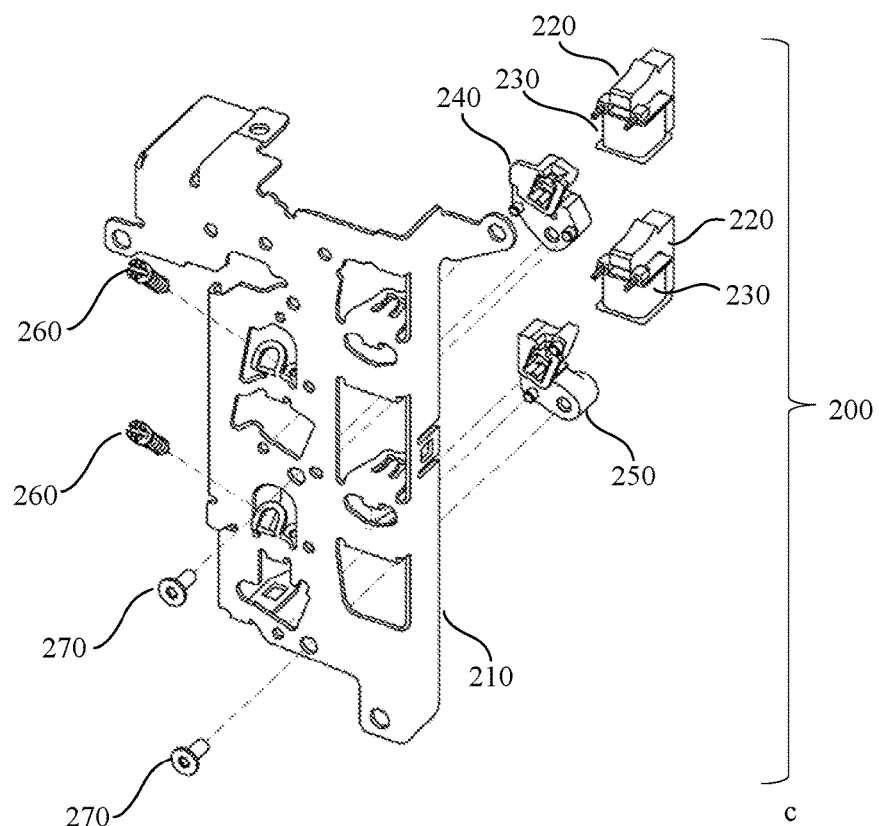
FIG. 11 is an exploded perspective view of an MG base plate unit.

FIG. 11 is an exploded perspective view of an MG base plate unit 200. An MG base plate 210 is a component which is formed of a sheet metal, and holds a yoke 220, a coil 230, a photo-interrupter holder 240, a photo-interrupter holder 250, and an adjuster worm 260. A photo-interrupter holder 240 is attached to the MG base plate 210 with a screw 270. The yoke 220 and the coil 230 become electromagnets when the coil 230 is energized, and are configured to attract a front armature 460 and a rear armature 550, described later.

Figure 12:
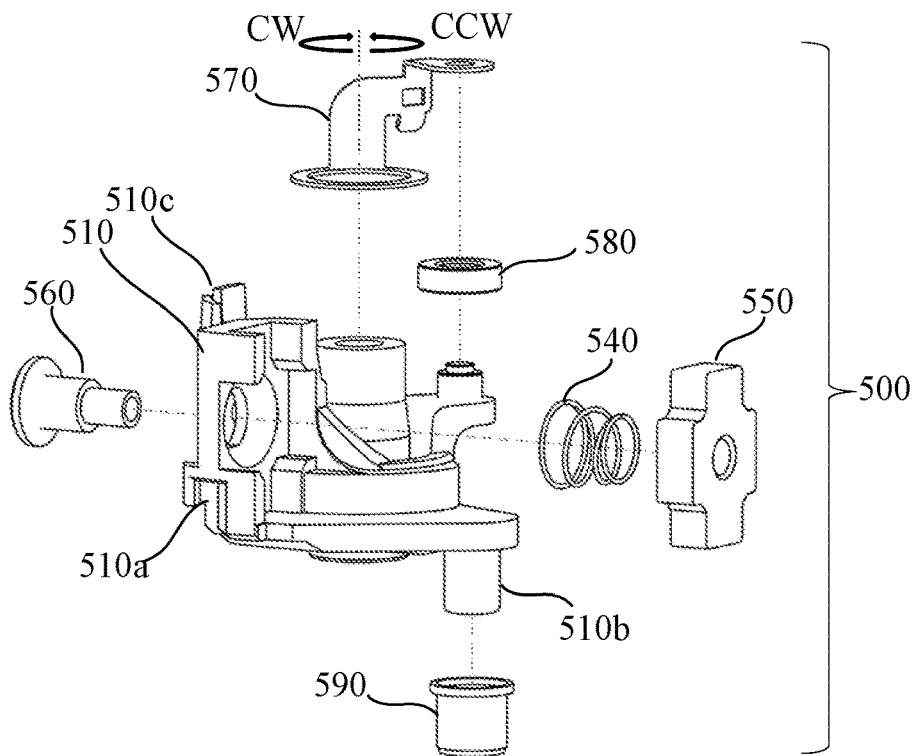
FIG. 12 is an exploded perspective view of a rear drive lever unit.

FIG. 12 is an exploded perspective view of the rear drive lever unit 500. The rear armature 550 is caulked and held so as to hold the rear drive lever 510 and an armature spring 540 by locally deforming the tip of a rear armature spring shaft 560. Since a plurality of components are involved in a charge operation of the rear drive lever unit 500, due to a tolerance, it is difficult to accurately align the rear armature 550 with the position of an attraction surface of the yoke 220. This embodiment provides a surplus by a tolerance as a charge stroke in advance, and uses the armature spring 540, the rear armature 550, and the rear armature shaft 560 in order to absorb the extra charge. More specifically, an armature unit including the rear armature 550 and the rear armature shaft 560 can move the armature spring 540 by a minute amount to a direction in which the armature spring 540 is compressed against the rear drive lever 510. A roller 580 functions as a cam follower of a cam 318a of the rear curtain charge cam gear 318. A roller cover 570 prevents the roller 580 from falling off. The rear drive pin 510b is engaged with the rear shutter curtain 800 and fitted into a drive pin cover 590 which is made of metal, in order to improve the surface hardness for a dust preventive measure. API light shielding portion 510c is used to detect an operation by a photo-interrupter (not illustrated).

Figure 13:
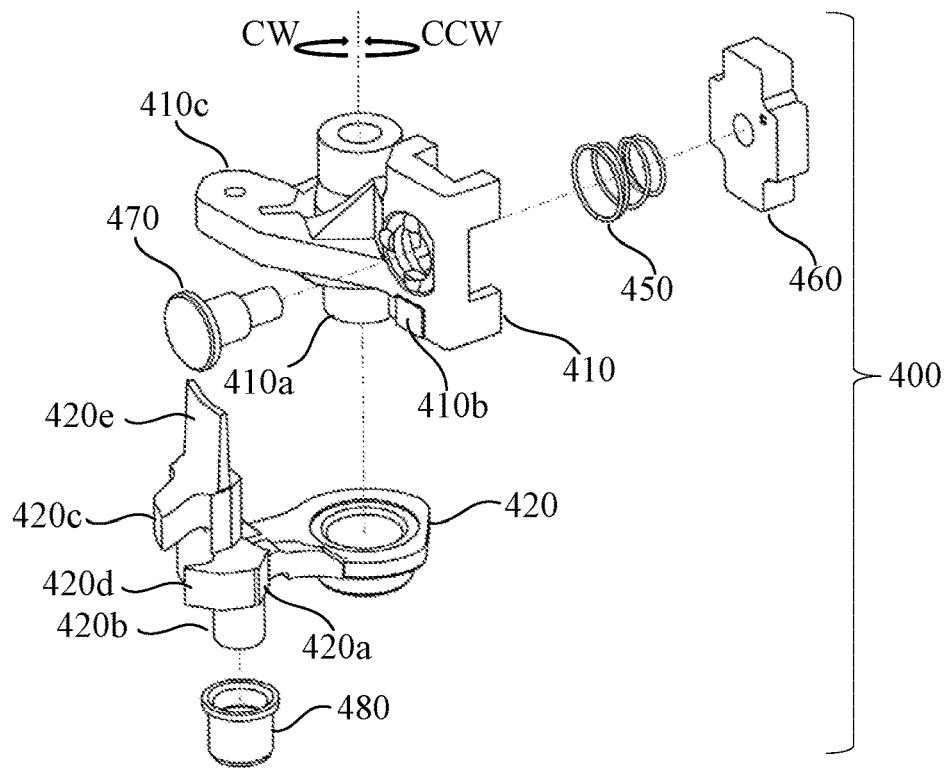
FIG. 13 is an exploded perspective view of a front drive lever unit.

FIG. 13 is an exploded perspective view of the front drive lever unit 400. The front drive lever unit 400 can be divided into the front drive lever 410 and the front blade lever 420. The front drive lever 410 includes a cam follower 410c which is charged by the roller 380. Further, the front drive lever 410 holds the armature spring 450, the front armature 460 and a front armature shaft 470. The front blade lever 420 includes the drive pin 420b which is engaged with an engagement portion 750a of the front shutter curtain 700. The drive pin 420b is engaged with a drive pin cover 480 made of metal in order to increase the surface hardness for a dust preventive measure. The front shutter curtain 700 moves in conjunction with an operation of the front blade lever 420. The front blade lever 420 is engaged with a front blade lever engagement shaft 410a of the front drive lever 410 and forced counterclockwise by a force of the backlash elimination spring 770. The locked portion 420c of the front blade lever 420 is locked by the locking portion 160c of the first lock lever 160 when the front shutter curtain 700 retreats from the aperture (retreat state). The locked portion 420d of the front blade lever 420 is locked by the locking portion 170a of the second lock lever 170 when the front shutter curtain 700 is closes the aperture (closed state). There is a timing to transfer from a state in which the front drive lever 410 is held by the slide lever 330 to a state in which the energization to the front drive lever 410 is maintained by the electromagnet including the yoke 220 and the coil 230. At this time, the front drive lever 410, the front blade lever 420 and the front shutter curtain 700 are slightly rotated by the surplus amount of the charge stroke. Thereby, the second lock lever 170 suppresses bouncing of the front blade lever 420 and the front shutter curtain 700. The PI light shielding portion 420e is used to detect an operation with a photo-interrupter (not illustrated).

Figure 25:
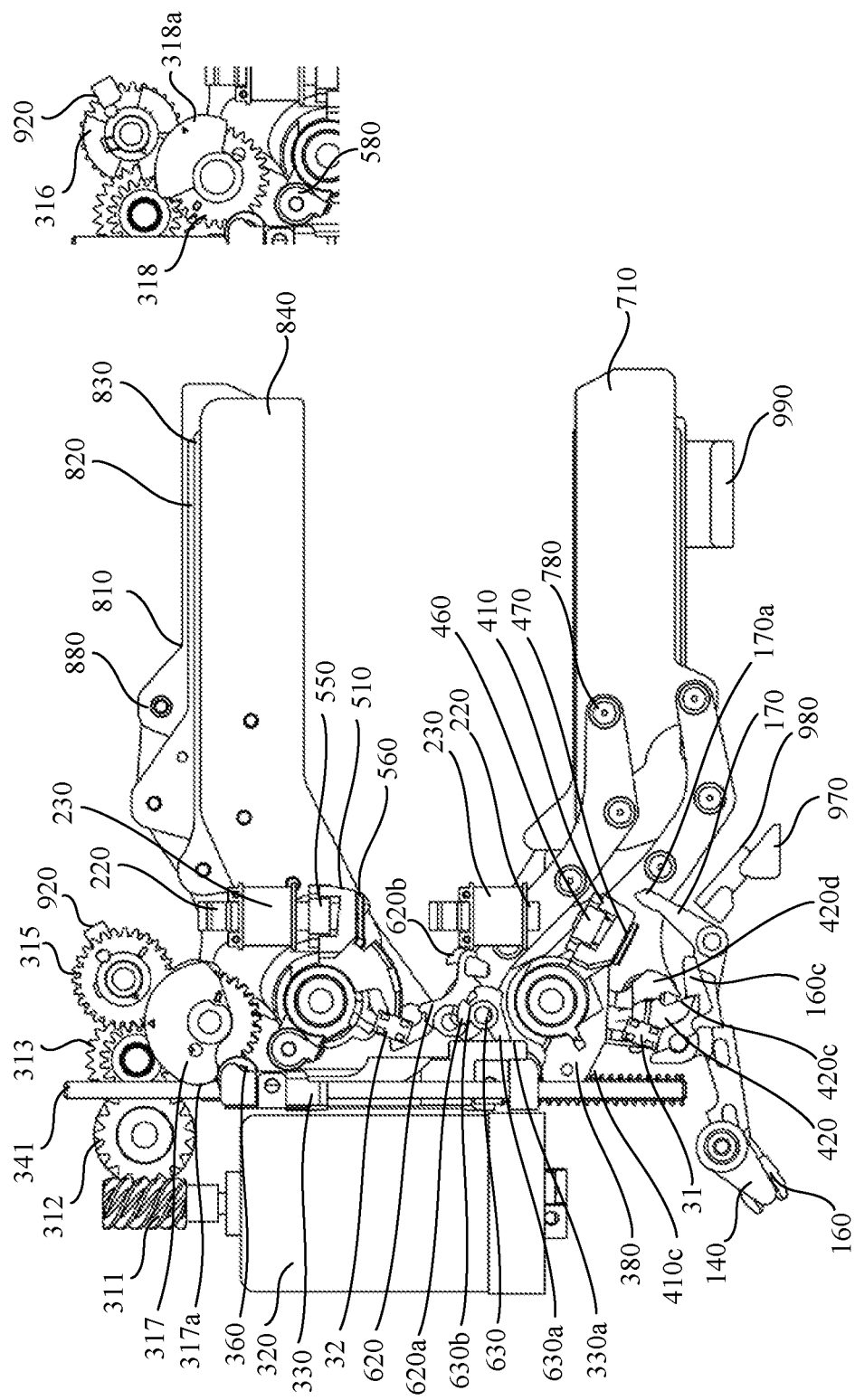
FIG. 25 illustrates a state in which a front drive lever starts charging while the front blade lever is locked.
Figure 26:
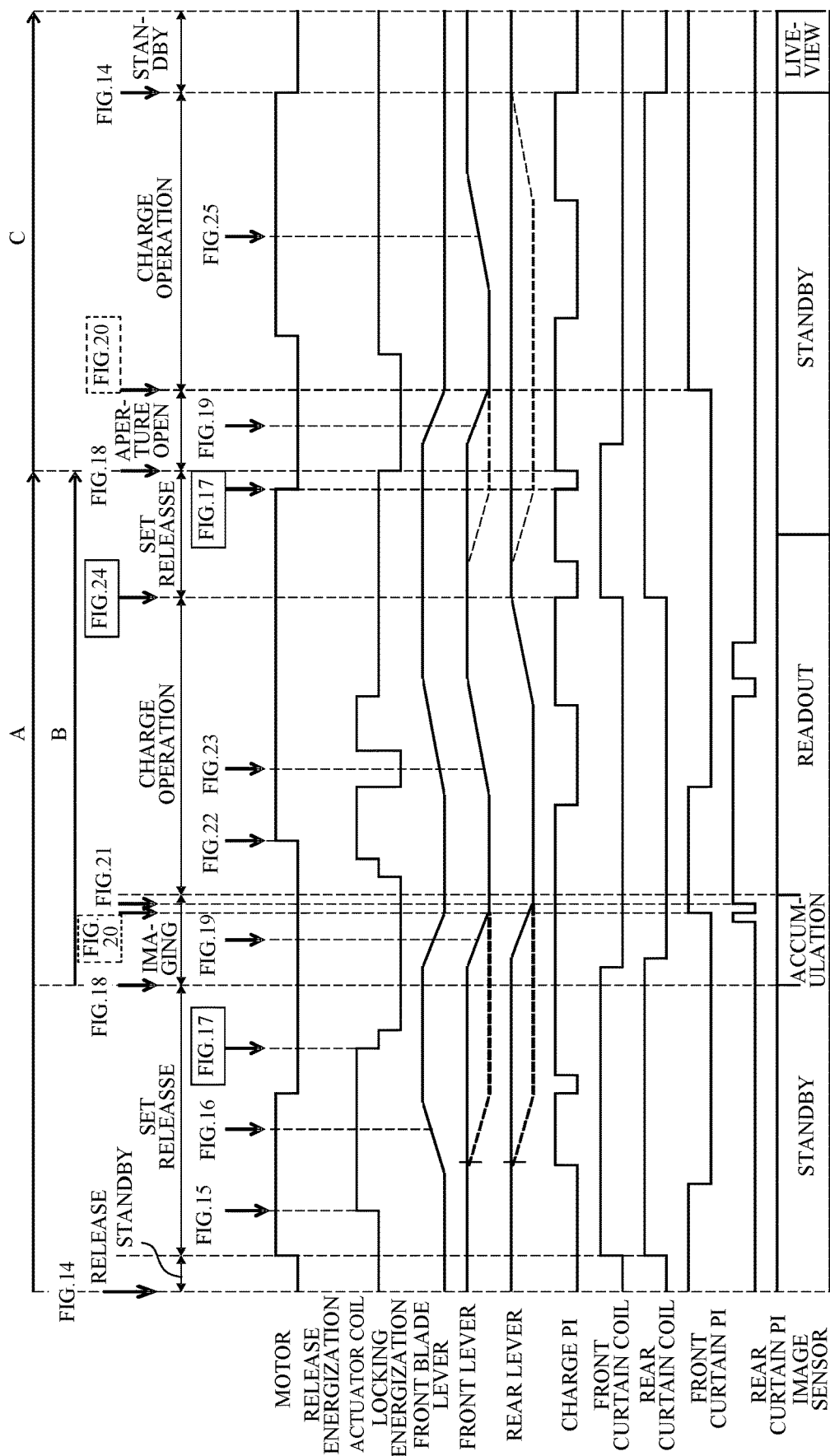
FIG. 26 is a timing chart showing an operation of each component during a shutter operation.
Figure 27:
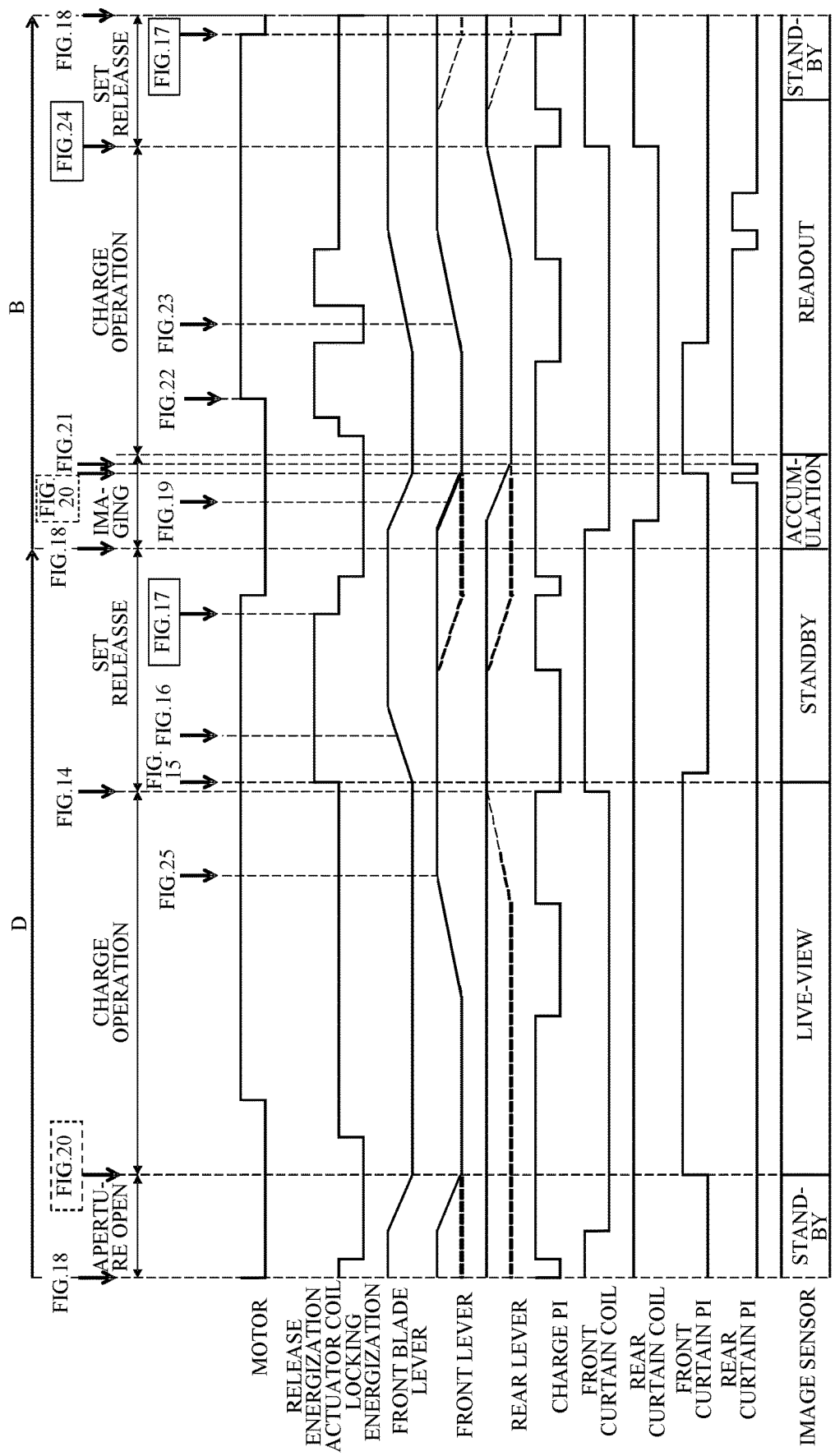
FIG. 27 is a timing chart showing an operation of each component during the shutter operation.
Figure 28:
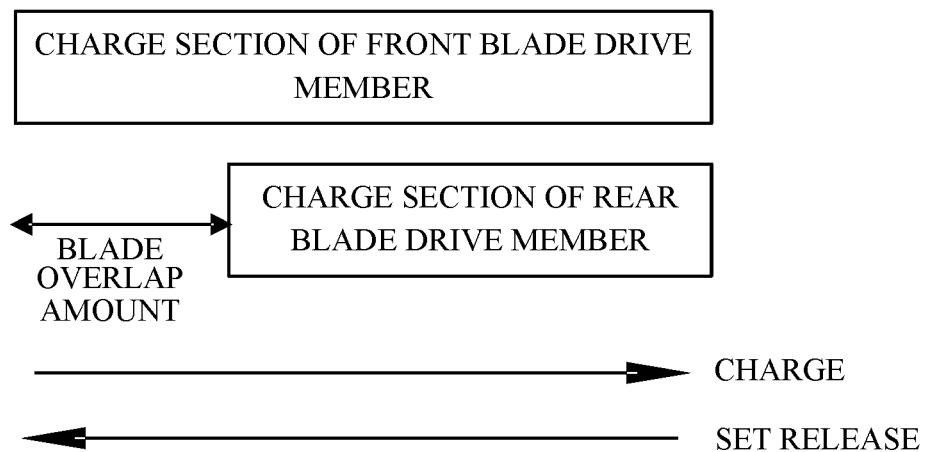
FIG. 28 schematically illustrates a charge range of a front blade drive member and rear blade drive member.

Referring now to FIGS. 14-27, a description will be given of a series of operations of the shutter 1000 during imaging. Each of FIGS. 14-25 is composed of large and small figures. The small upper right figure does not illustrate the front curtain charge cam gear 317 so that the rear curtain charge cam gear 318 located behind the front charge cam gear 317 can be seen. FIGS. 26 and 27 are timing charts showing the movement of each component during the shutter operation, and the figure numbers are added to the timings of the respective states illustrated in FIGS. 14-25.

Figure 14:
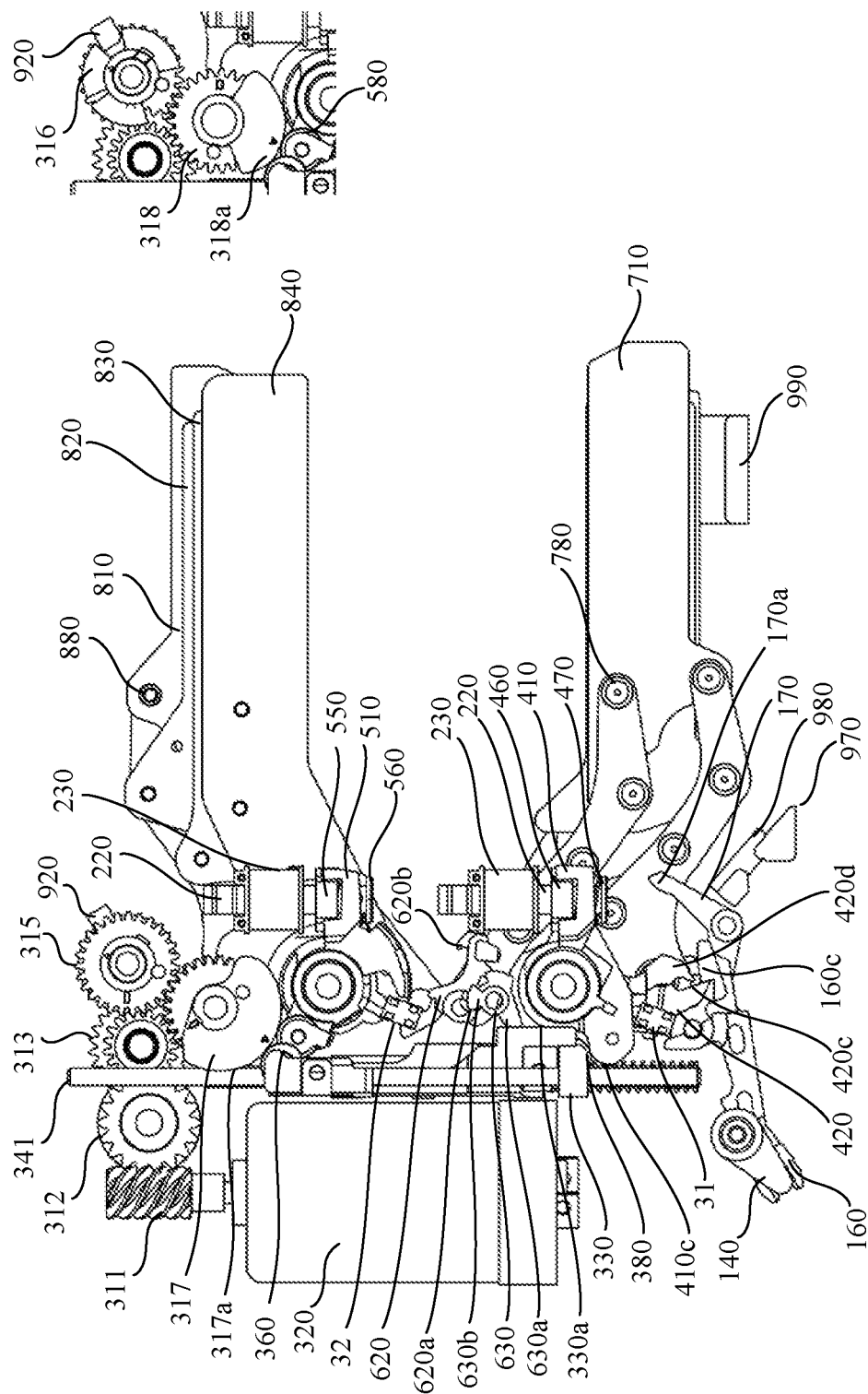
FIG. 14 illustrates a standby state of a focal plane shutter.

FIG. 14 illustrates a standby state of the shutter 1000. The cam follower 410c is locked by the roller 380 so as to prevent the front drive lever 410 from rotating clockwise due to the force of the main spring 430. The slide lever 330 is locked by the cam 317a so as to prevent the slide lever return spring 350 and the main spring 430 from moving upward due to the force of the main spring 430. The locked portion 420c is locked by the locking portion 160c so as to prevent the front blade lever 420 from rotating counterclockwise due to the force of the front backlash elimination spring 770. The front shutter curtain 700 is in the retreated state, and a light beam from the lens unit 2 can be guided to the image sensor 6. The roller 580 is locked by the cam 318a so as to prevent the rear drive lever 510 from rotating clockwise due to the force of the main spring 520.

Figure 15:
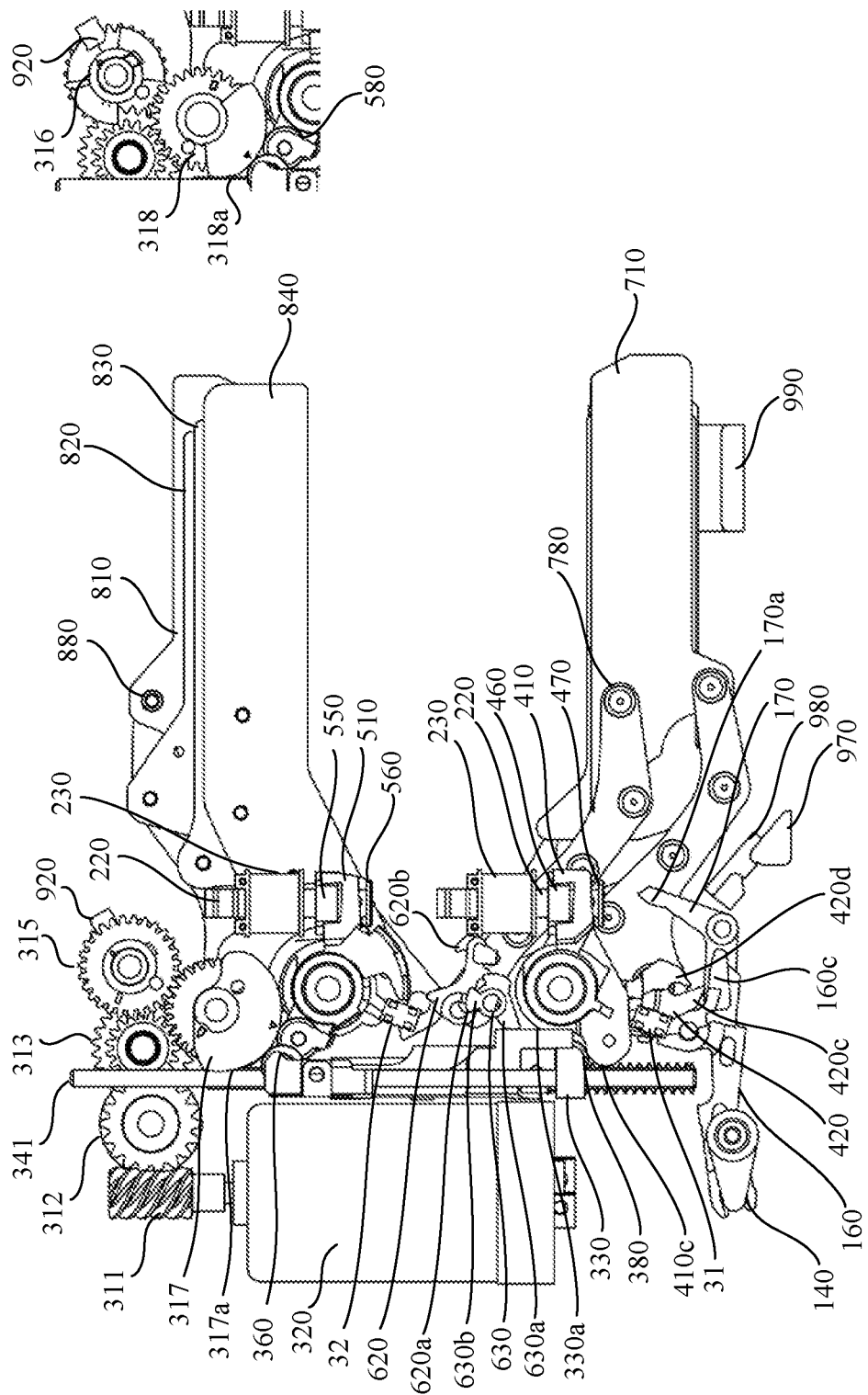
FIG. 15 illustrates a state in which a locking portion of a first lock lever is retreated to an outside of a drive locus of a locked portion of a front blade lever.

FIG. 15 illustrates a state in which the locking portion 160c is retreated to the outside of the drive locus of the locked portion 420c by energizing the actuator coil 120. Thereafter, the front blade lever 420 and the front shutter curtain 700 start rotating counterclockwise.

Figure 16:
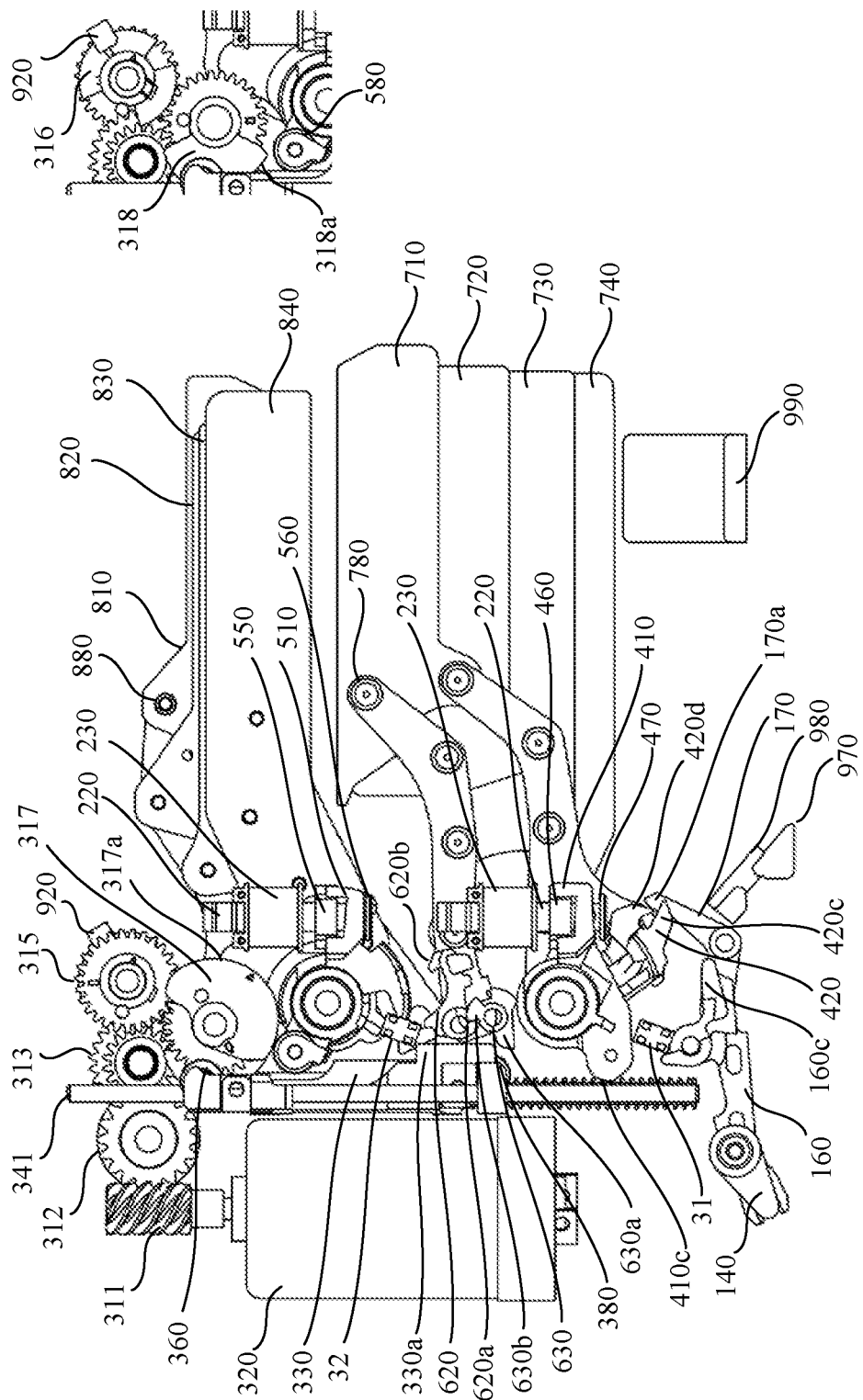
FIG. 16 illustrates how the locked portion of the front blade lever goes over a locking portion of a second lock lever.

FIG. 16 illustrates a state in which the locked portion 420d goes over the locking portion 170a. By this operation, the second lock lever 170 is pushed out from the drive locus of the front blade lever 420. However, the second lock lever 170 returns to the original position by continuing energizing the actuator coil 120 so that the first lock lever 160 moves to the outside of the drive locus of the front blade lever 420 (so that the second lock lever 170 moves to inside of the front blade lever 420).

Figure 17:
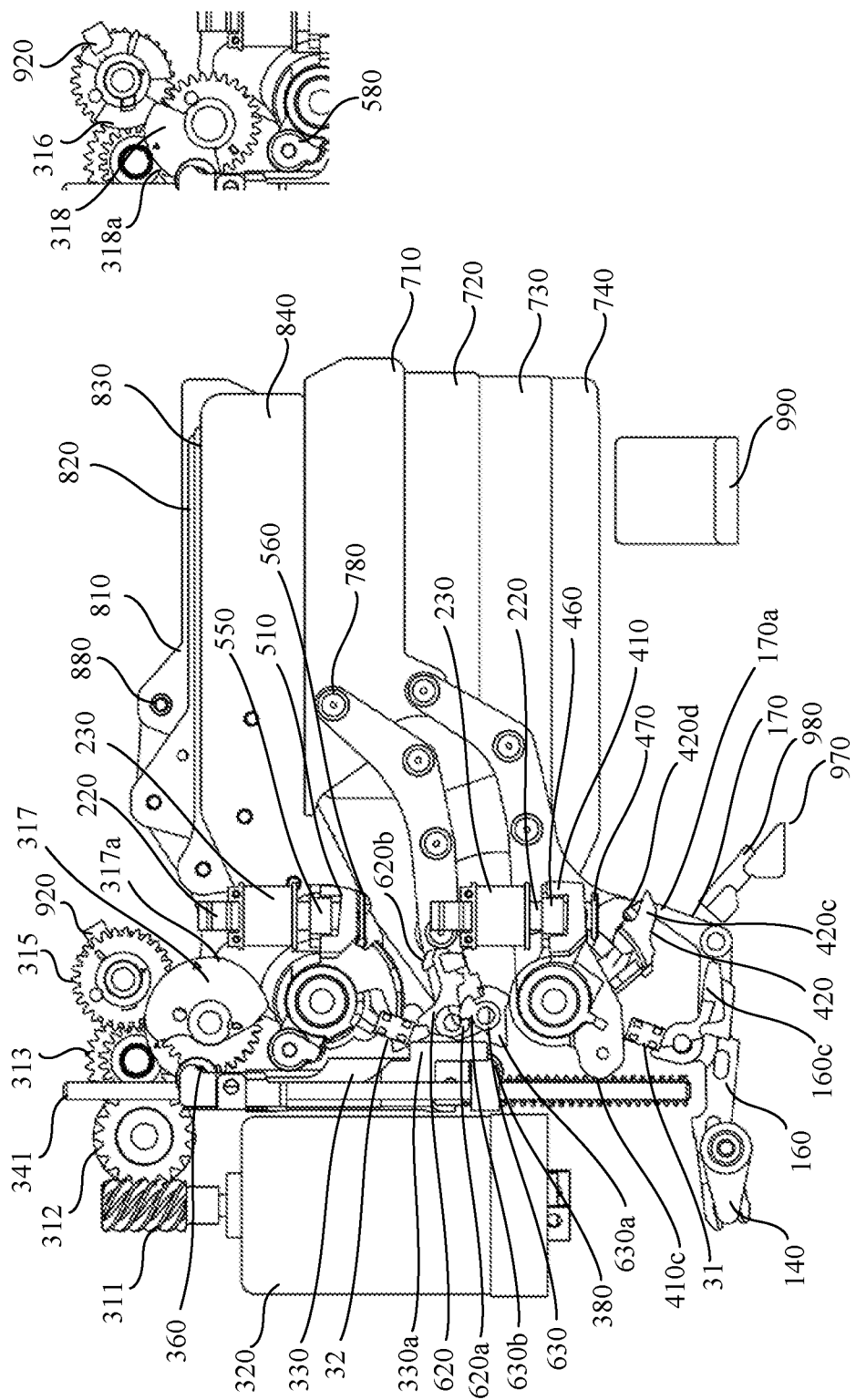
FIG. 17 illustrates a state in which a front blade lever is rotated counterclockwise from the state in FIG. 16.

FIG. 17 illustrates a state in which the front blade lever 420 is rotated counterclockwise from the state of FIG. 16. The front blade lever 420 is rotated to a position in which a front drive lever contacting portion 420a provided on the front blade lever 420 contacts a front blade lever contacting portion 410b of the front drive lever 410 by the force of the front backlash elimination spring 770. When the front drive lever contacting portion 420a contacts the front blade lever contacting portion 410b, the front blade lever 420 and the front shutter curtain 700 are to bounce due to the repulsion of the movement. At this time, the front blade lever 420 is bound-locked by the locked portion 420d being locked by the locking portion 170a.

Figure 18:
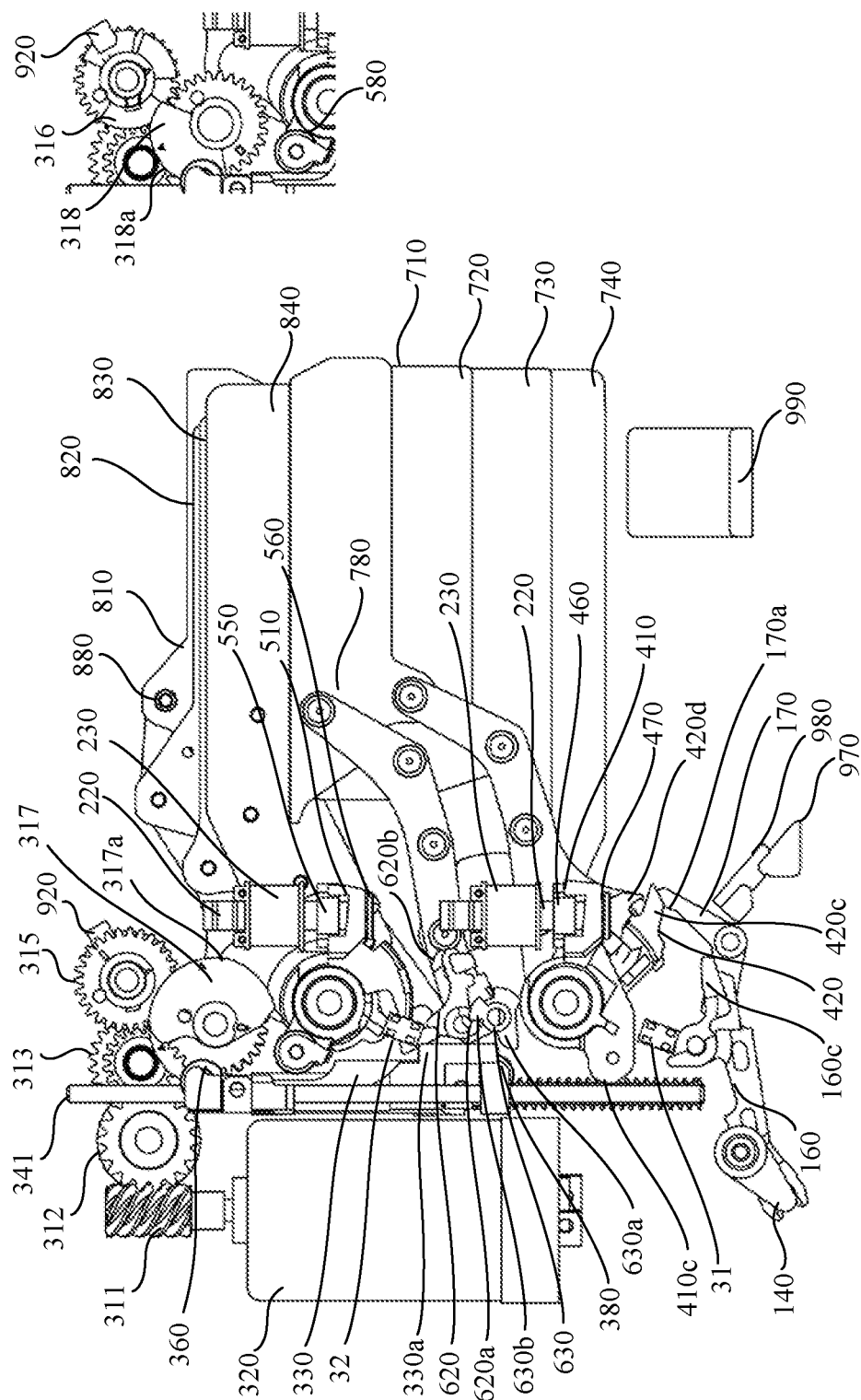
FIG. 18 illustrates a set release state.

FIG. 18 illustrates a set release state in preparation for an exposure operation. Namely, the front curtain charge cam gear 317 and the rear curtain charge cam gear 318 are rotated to positions where the front drive lever 410 and the rear drive lever 510 are movable. The slide lever 330 is moved in the direction of retreating from the front drive lever 410 by the force of the slide lever return spring 350. Further, the cam 318a is retreated to the outside of the movement locus of the rear drive lever 510. The front drive lever 410 and the rear drive lever 510 are each forced clockwise, but are attracted and held by energizing the coil 230. Thereafter, before the energization to the coil 230 is cut off, the actuator coil 120 is energized so that the locking portion 170a moves to the outside of the drive locus of the locked portion 420d.

Thereafter, the shutter 1000 cuts off the energization to the coil 230 at a predetermined interval, and the exposure to the image sensor 6 is started. The speed control of the imaging apparatus 1 is performed by changing the interval at which the energization to the front coil 230 and the rear coil 230 is cut off.

Figure 19:
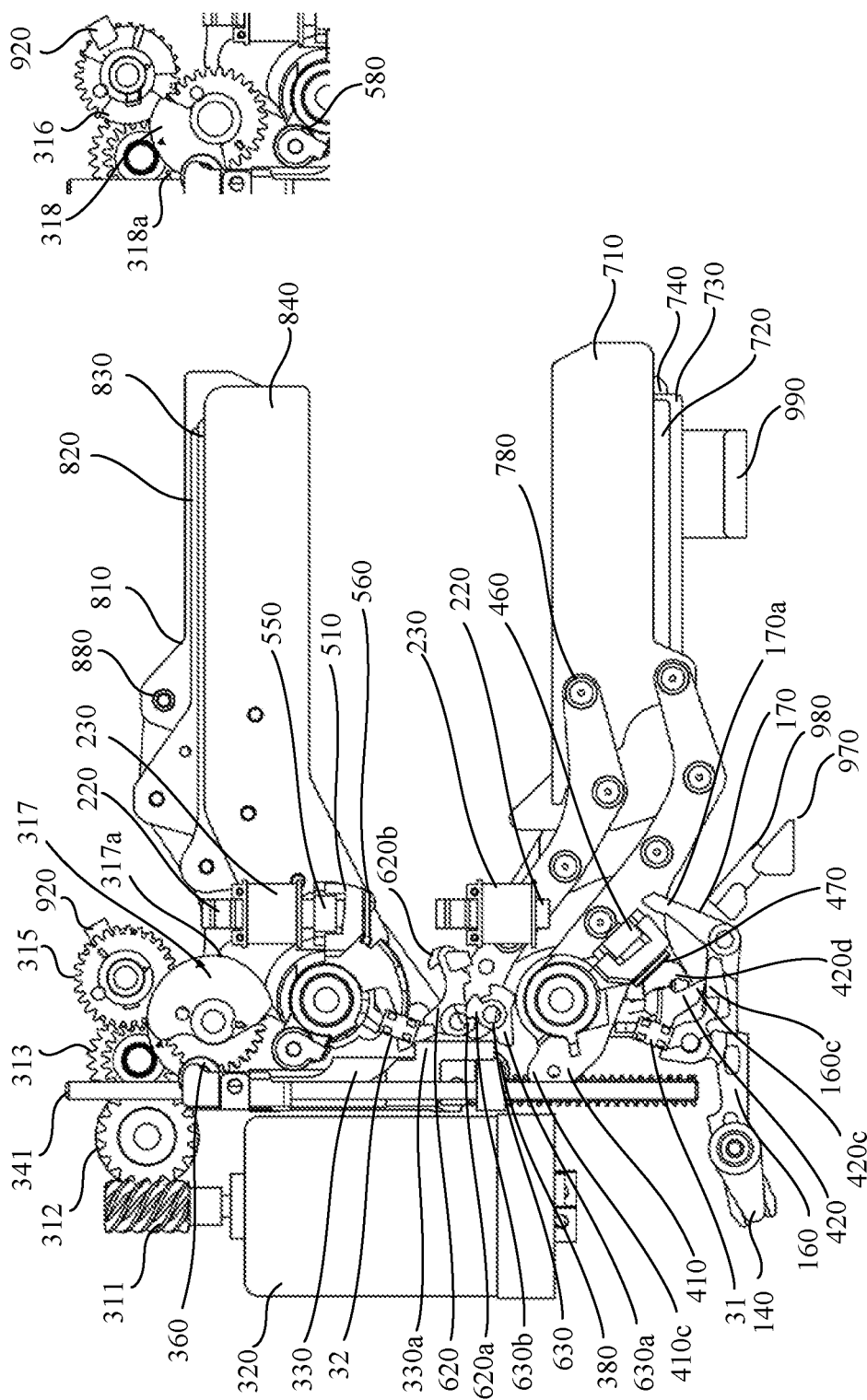
FIG. 19 illustrates a state in which the front drive lever, a front blade lever and a front shutter curtain are integrally rotating clockwise.

FIG. 19 illustrates a state in which the front drive lever 410, the front blade lever 420, and the front shutter curtain 700 are integrally rotating clockwise. The actuator coil 120 is energized so that the locking portion 160c locks the locked portion 420c. The front blade lever 420 pushes aside the first lock lever 160 and continues to rotate clockwise. Since the energization to the actuator coil 120 is continued so that the locking portion 160c locks the locked portion 420c, the first lock lever 160 returns to a position where the front blade lever 420 can be locked.

Figure 20:
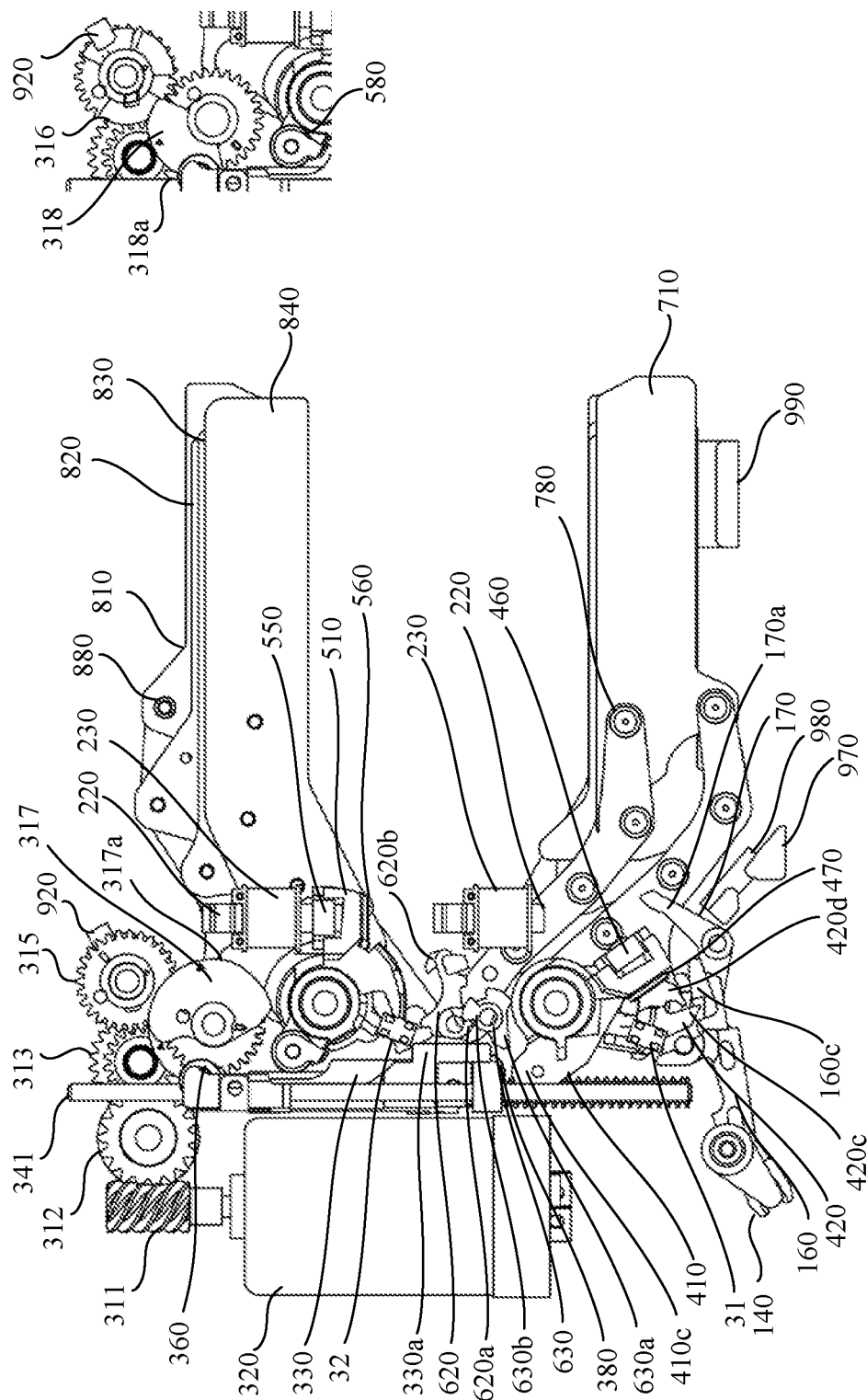
FIG. 20 illustrates a state in which the front drive lever, the front blade lever, and the front shutter curtain complete moving.

FIG. 20 illustrates a state in which the front drive lever 410, the front blade lever 420, and the front shutter curtain 700 have completed their movements. The front blade lever 420 is relieved by the half-moon rubber 960. The front shutter curtain 700 is relieved by the arm rubber 970 and the blade tip rubber 990. However, since the impact at the movement completion is large, the front drive lever 410, the front blade lever 420, and the front shutter curtain 700 are repelled. At this time, the locking portion 160c receives the locked portion 420c, so that the front shutter curtain 700 can be prevented from unintentionally entering the aperture.

Figure 21:
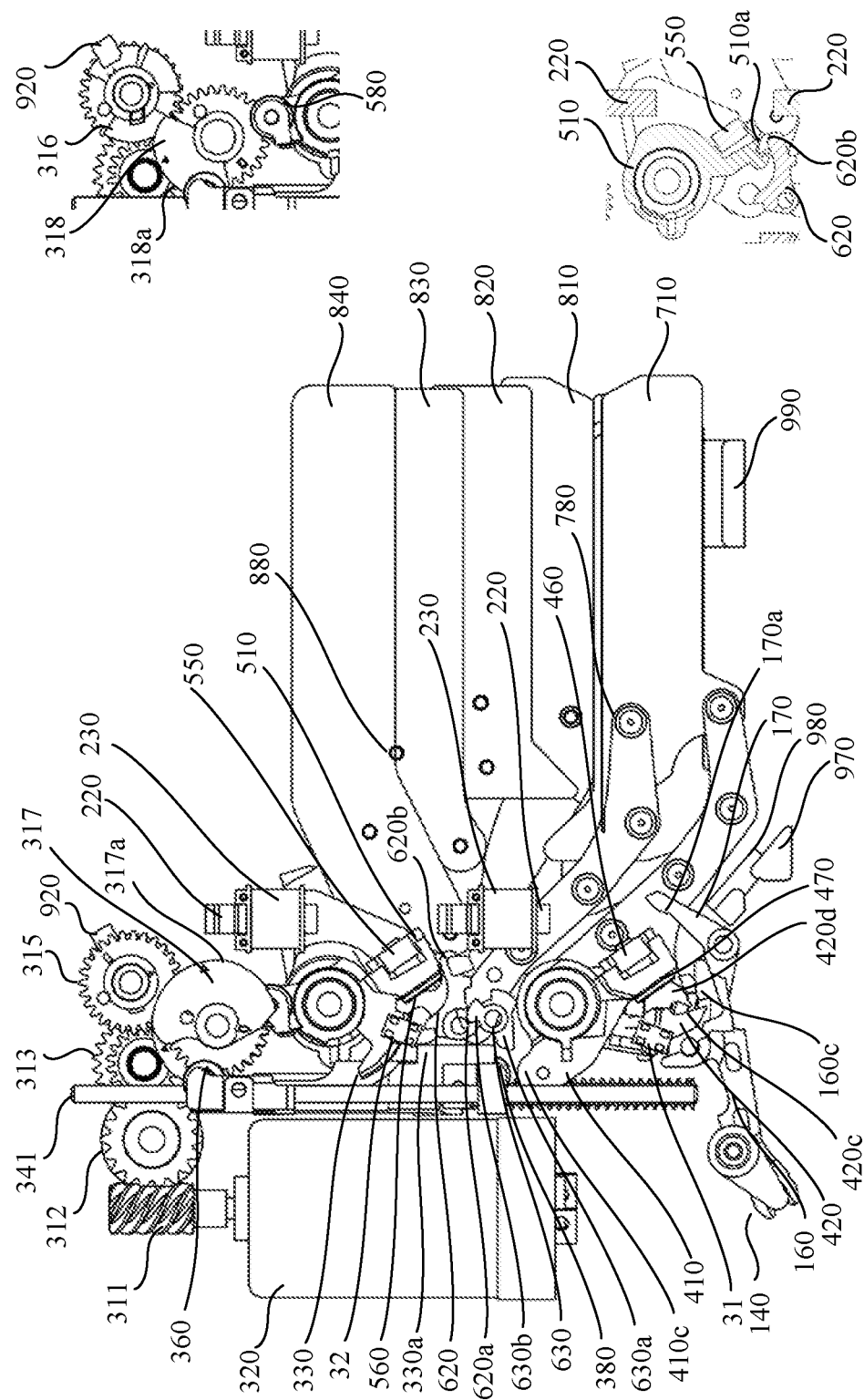
FIG. 21 illustrates a state in which the rear drive lever and the rear shutter curtain complete moving.

FIG. 21 illustrates a state in which the rear drive lever 510 and the rear shutter curtain 800 have completed the movements by continuing the clockwise rotation from the state of FIG. 19. In this process, as illustrated in the lower right diagram, the locked portion 510a of the rear drive lever 510 pushes aside the locking portion 620b of the rear curtain bound lock lever 620. However, the rear curtain bound lock lever 620 rotates to the position in which the rear drive lever 510 is locked by the force of the bound lock spring 640. Although the rear drive lever 510 and the rear shutter curtain 800 are each buffered by the half-moon rubber 940 and the blade tip rubber 990, they tends to bounce since the impact at the time of movement completion is large. At this time, the locking portion 620b receives the locked portion 510a, so that the bounce can be suppressed.

After the exposure operation by the front shutter curtain 700 and the rear shutter curtain 800 is completed and a predetermined time elapses, the energization to the motor 320 is resumed to charge for the next imaging. Before the motor 320 is energized, the actuator coil 120 is energized to unlock the front blade lever 420 from the first lock lever 160 so that the front drive lever 410 and the front blade lever 420 rotate integrally. When the energization to the motor 320 is resumed, the front curtain charge cam gear 317 rotates counterclockwise, and the rear curtain charge cam gear 318 rotates clockwise.

Figure 22:
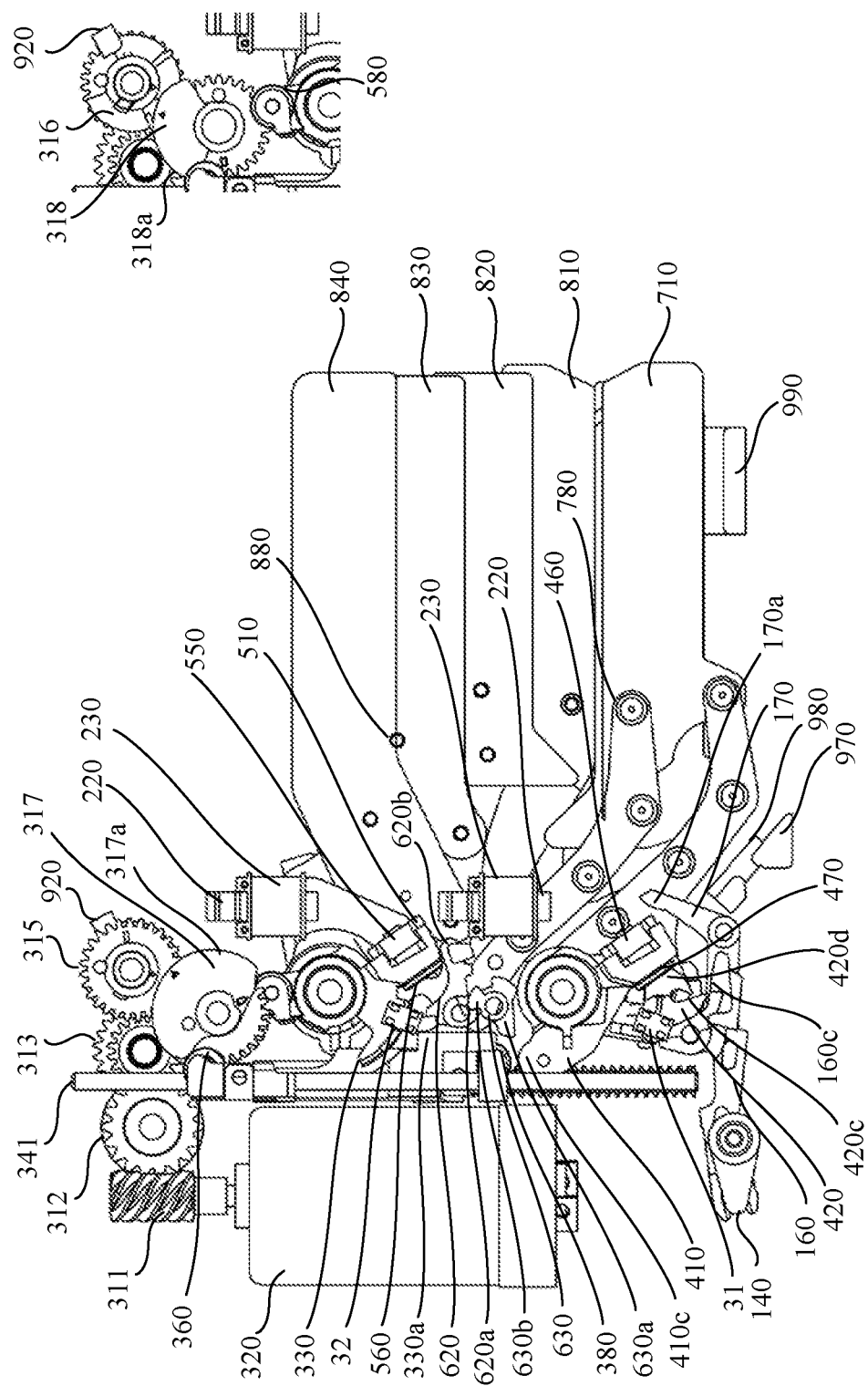
FIG. 22 illustrates a state in which a slide lever starts moving in a downward direction.

FIG. 22 illustrates a state in which the cam 317a contacts the roller 360 and the slide lever 330 starts moving downward. When the energization to the motor 320 is continued, the front curtain charge cam gear 317 continues to rotate counterclockwise, and the rear curtain charge cam gear 318 continues to rotate clockwise. In this process, the cam portion 330a pushes aside the bound lock lever release portion 630a to unlock the rear curtain bound lock lever 620.

Figure 23:
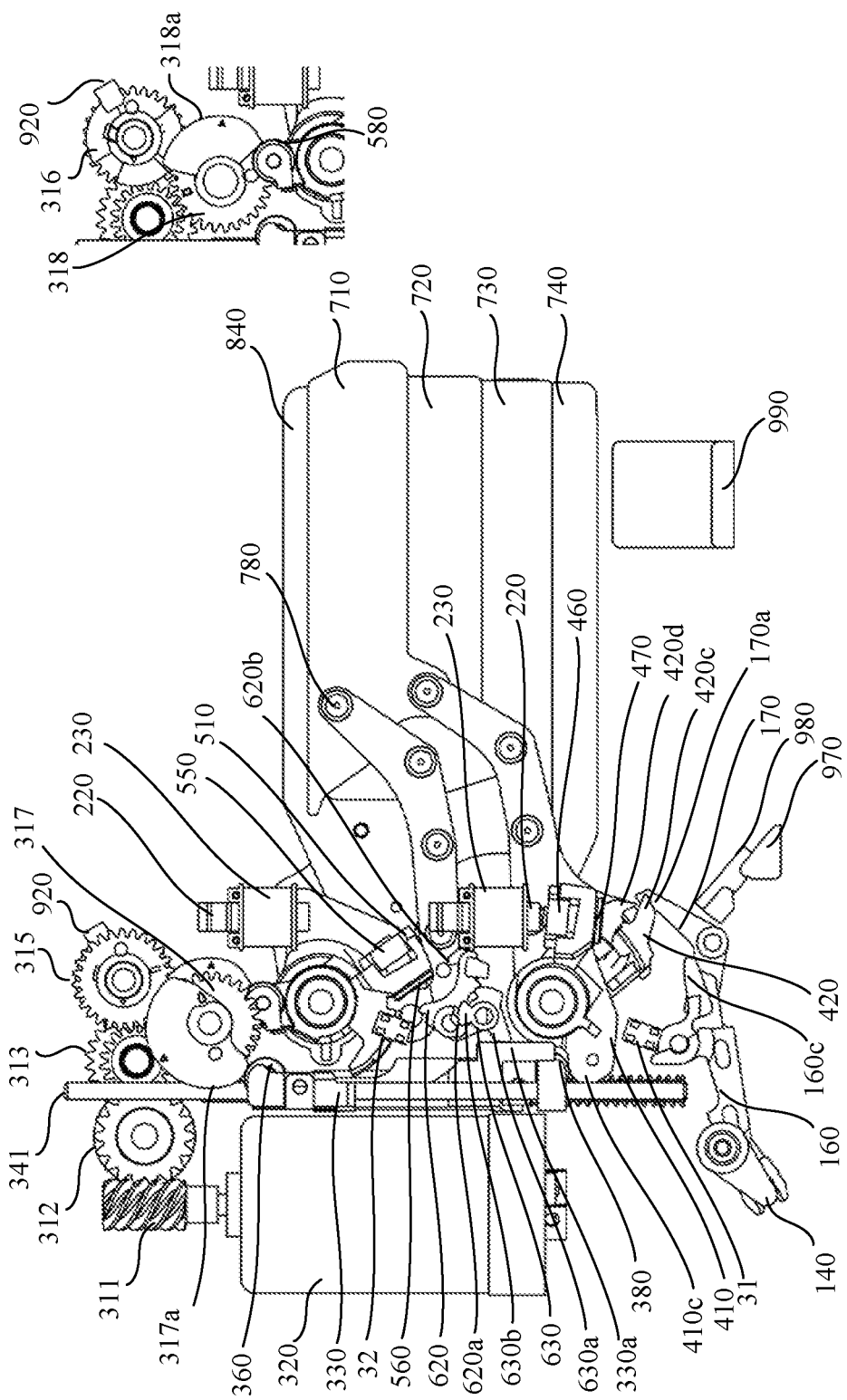
FIG. 23 illustrates a state in which the rear drive lever starts charging.

FIG. 23 illustrates a state in which the cam 318a contacts the roller 580 and the rear drive lever 510 starts charging. The actuator coil 120 is energized so that the front blade lever 420 is unlocked from the second lock lever 170. This is because the second lock lever 170 contacts the front blade lever 420 which is only forced by the front drive lever 410 with the force of the front backlash elimination spring 770 so that the front blade lever 420 does not fall behind the front drive lever 410.

As described above, the front drive lever unit 400 is divided into the front drive lever 410 and the front blade lever 420, and the front blade lever 420 is only forced by the front drive lever 410 with a spring having a weak force. Hence, the front blade lever 420 falls behind the front drive lever 410, and the overlap amount decreases between the front shutter curtain 700 and the rear shutter curtain 800. This becomes more noticeable as the frame rate is increased. If the overlap amount is not sufficiently secured between the front shutter curtain 700 and the rear shutter curtain 800, light may enter the image sensor that is being read. However, at the timing of the state of FIG. 23, most of the charge of the first lever 410 is completed, and the first armature 460 is close to the yoke 220. The front shutter curtain 700 is almost at the retreat state, and the rear shutter curtain 800 is also at the retreat state. Namely, it is close to a double light shielding state, and a satisfactory light shielding state is secured for the image sensor 6 from which an image is being read. Therefore, even if the front blade lever 420 is delayed with respect to the charge operation of the front drive lever 410 at a high frame rate, the image sensor 6 is unlikely to expose during charging. As described above, in this embodiment, both the front drive lever 410 and the rear drive lever 510 are not charged by a linear movement lever such as the slide lever 330. In this embodiment, the front drive lever 410 on the side far from the gear group is charged with a linear movement lever in consideration of space saving, while the rear drive lever 510 on the side near the gear group is charged with another charge unit. As a result, since the rear drive lever 510 can be charged after the front drive lever 410 is sufficiently charged, it is possible to secure a satisfactory light shielding state of the image sensor 6 during charging.

Figure 24:
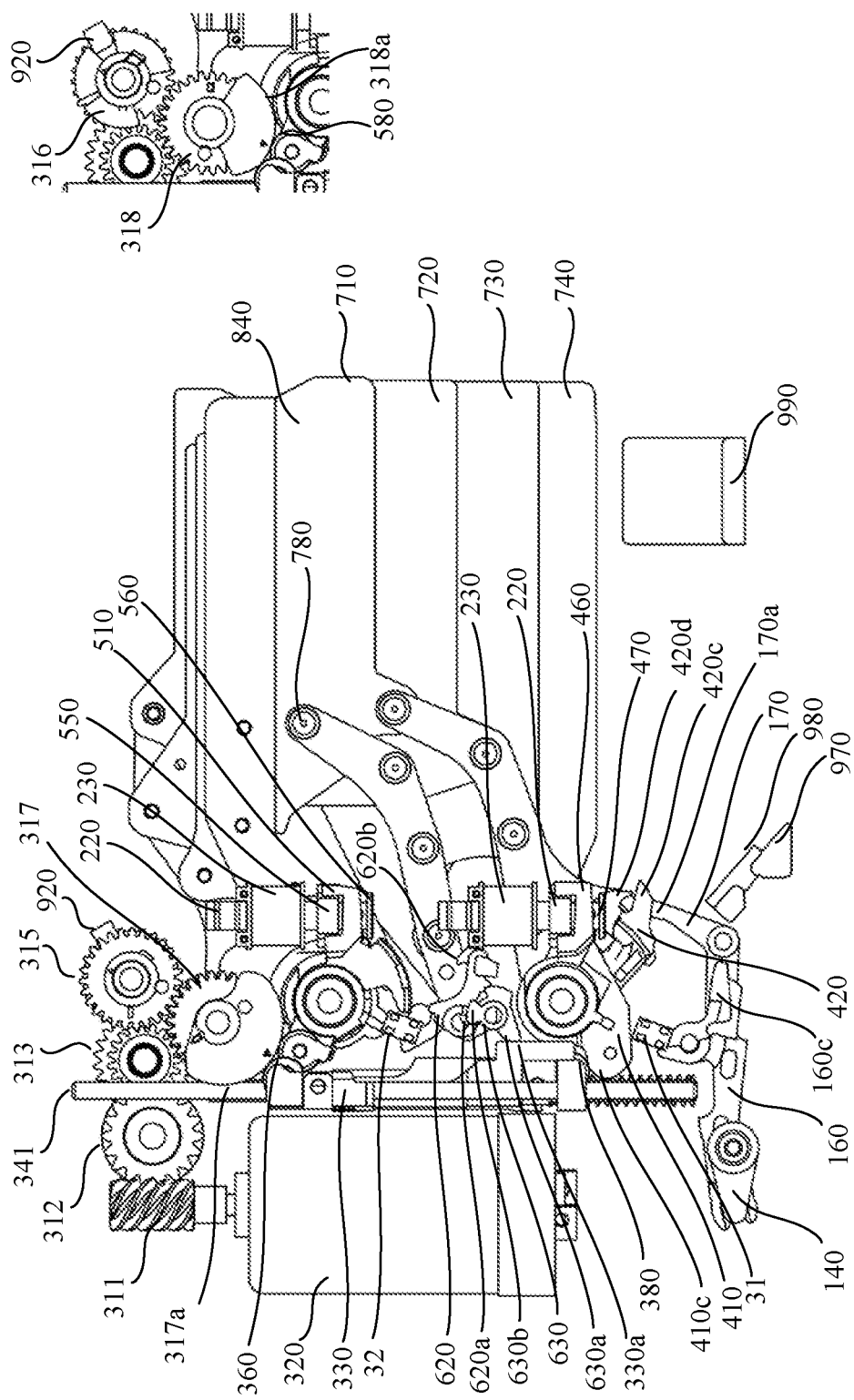
FIG. 24 illustrates a charge completion state.

FIG. 24 illustrates a charge completion state. The front drive lever 410 is held at a position rotated counterclockwise to the maximum by the slide lever 330. The rear drive lever 510 is held at a position rotated counterclockwise to the maximum by the rear curtain charge cam gear 318. The actuator coil 120 is energized so that the front blade lever 420 is locked by the second lock lever 170. Accordingly, the bounce of the front drive lever unit 400 is suppressed where the bounce is caused by the reaction force which charges the armature spring 450, after the front drive lever 410 and the front drive lever 420 are vigorously charged and the front armature 460 contacts the yoke 220.

Thereafter, the energization to the motor 320 is continued, and the state returns to the state of FIG. 17. The locking of the front blade lever 420 by the second lock lever 170 is maintained. This is to prevent the front blade lever 420 from bouncing when the front drive lever 410 slightly rotates clockwise while the mechanical holding state transfers to the energization maintaining state. After the bounce of the front blade lever 420 is settled, the front blade lever 420 is unlocked from the second lock lever 170, the set release is completed, and the state illustrated in FIG. 18 is obtained. The operation described above is an operation A in FIG. 26. In the case of continuous imaging, an operation B (imaging, charge operation, and set release) of FIG. 26 is repeated.

In a case of single imaging, as illustrated in FIG. 26, after releasing the set, only the front shutter curtain 700 is driven to obtain the state illustrated in FIG. 20, and the front blade lever 420 is locked by the first lock lever 160. The energization to the rear drive lever unit 500 is maintained, and the rear shutter curtain 800 is prohibited from moving. FIG. 25 illustrates a state in which the front drive lever 410 is started to be charged while the front blade lever 420 is locked. Thereafter, charging of the front drive lever 410 is continued. Since the energization to the rear drive lever unit 500 is maintained, there is no need to charge the rear drive lever 510. When the phase detection photo-interrupter unit 920 detects the standby phase of the front curtain charge cam gear 317, the motor 320 is stopped. At this time, the process returns to the standby state of FIG. 14. The operation above is an operation C in FIG. 26.

In this embodiment, the phase detection photo-interrupter unit 920 detects the phase of the front curtain charge cam gear 317, but the present invention is not limited to this embodiment. When the number of teeth of the second gear 313 is coincident with the number of teeth of the rear curtain charge cam gear 318, the phase detection photo-interrupter unit 920 may detect the phase of the rear curtain charge cam gear 318 by providing a phase plate coaxially with the second gear 313.

As described above, in this embodiment, the first lock lever 160 is used to suppress the bounce of the front blade lever 420 at the timing of FIG. 20 in FIG. 26. At the timing of FIG. 20, the energization to the actuator coil 120 is continued. Therefore, even if the first lock lever 160 is bounced off by the front blade lever 420, the bounce can be suppressed by immediately returning to the position where the locked portion 420c can be locked by the locking portion 160c.

The second lock lever 170 interlocked with the first lock lever 160 is used to suppress the bounce of the front blade lever 420 at the timings of FIGS. 17 and 24 in FIG. 26. At the first timing of FIG. 17, the energization to the actuator coil 120 is continued. Therefore, even if the second lock lever 170 is bounced off by the front blade lever 420, the bounce can be suppressed by immediately returning to the position where the locked portion 420d can be locked by the locking portion 170a. In this embodiment, in order to prevent the front blade lever 420 from contacting the second lock lever 170 at the timing of FIG. 23, the actuator coil 120 is energized once and the second lock lever 170 is moved to the outside of the drive locus of the front blade lever 420. Then, the bounce can be suppressed with a smooth charge operation, by energizing the actuator coil 120 again at the timing illustrated in FIG. 24 to move the second lock lever 170 into the drive locus of the front blade lever 420. At the second timing of FIG. 17, the bounce at the time of releasing the set can be suppressed by using the second lock lever 170 as it is which is moved into the drive locus of the front blade lever 420 in FIG. 24. Thereafter, no unnecessary waiting time occurs since the actuator coil 120 is energized to move the second lock lever 170 to the outside of the drive locus of the front blade lever 420 before moving to the next operation.

As described above, this embodiment uses the second lock lever 170 at three different timings, and can effectively suppress the bounce where the bounce is generated by dividing the front drive lever unit 420 into the front drive lever 410 and the front blade lever 420.

This embodiment uses the slide lever 330 as the charge unit, but the present invention is not limited to this embodiment. The linear movement is not always necessary, and a link lever or the like can be used instead.

Referring now to FIG. 27, a description will be given of an imaging mode that displays an image on the display unit 9 between continuous imaging frames. FIG. 27 is a timing chart of each component during the shutter operation.

The movement from the release to the aperture open state (the state in which the shutter front curtain 700 is retreated from the aperture) in FIG. 27 is the same as the movement from the release to the aperture open state in FIG. 26, and a description thereof will be omitted.

In FIG. 27, in the aperture open state, the light beam which has passed through the lens unit 2 reaches the image sensor 6, so that an image can be displayed (live-view) on the display unit 9. By performing the live-view between continuously captured frames, it is possible to improve the moving object tracking performance (object visibility and autofocus performance on the display unit 9) during the continuous imaging.

The energization to the motor 320 is started at a predetermined timing from the live-view start, the front curtain charge cam gear 317 is rotated counterclockwise, and the rear curtain charge cam gear 318 is rotated clockwise. At this time, since the first lock lever 160 continues to lock the front blade lever 420, only the front drive lever 410 is charged as illustrated in FIG. 25. Since the energization to the rear drive lever unit 500 is maintained, there is no need to charge the rear drive lever 510. After that, a processing time elapses for the next imaging such as the lens drive for the autofocus and diaphragm drive time. Then, at a predetermined timing before and after the end of the live-view, the actuator coil 120 is energized, and the front blade lever 420 is unlocked from the first lock lever 160 as illustrated in FIG. 15. The state of FIG. 16 returns to the set release state through the state of FIG. 18. The operation above is an operation D in FIG. 26.

Thereafter, the operation proceeds to the imaging operation, and after the charge operation is performed while the image information is read out of the image sensor 6, the set is returned to the set release state again (operation B in FIG. 27). In the case of continuous imaging, the operation D and the operation B in FIG. 27 are repeated. When the imaging is finished, after the operation B in FIG. 27, the operation returns to the standby state through the operation C in FIG. 26.

As described above, the imaging mode that displays an image on the display unit 9 between continuously captured frames, starts preparing for the next imaging during the live-view (energization to the motor 320 is started). Then, the actuator coil 120 is energized at a predetermined timing before and after the end of the live-view, and the front shutter curtain 700 is returned to the movement start position by the force of the front backlash elimination spring 770. Accordingly, the continuously captured frame rate can be improved since it is possible to shift to the next imaging earlier than a case in which energizing the motor 320 and returning the shutter front curtain 700 to the movement start position are simultaneous with the end of the live-view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-238999, filed on Dec. 21, 2018 which is hereby incorporated by reference herein in its entirety.

What is claimed is:

1. A shutter unit comprising:
   a base plate having an aperture and to which a first blade member and a second blade member are rotatably attached;
   a first blade operation member movable integrally with the first blade member between a first movement completion position that provides a retreat state where the first blade member retreats from the aperture, and a first movement start position that provides a closed state where the first blade member closes the aperture;
   a second blade operation member movable integrally with the second blade member between a second movement completion position that provides a closed state where the second blade member closes the aperture, and a second movement start position that provides a retreat position where the second blade member retreats from the aperture;
   a first charge member configured to charge the first blade operation member from the first movement completion position to the first movement start position; and
   a second charge member configured to charge the second blade operation member from the second movement completion position to the second movement start position,
   wherein the first charge member and the second charge member include coaxially arranged cam gears and are configured to rotate in opposite directions.

2. The shutter unit according to claim 1, wherein the first blade operation member includes:
   a first drive member movable integrally with the first blade member and forced toward a first direction so that the first blade member moves from the retreat state to the closed state; and
   a second drive member connected to the first drive member and forced so that the first drive member moves to a second direction which is opposite direction to the first direction.

3. The shutter unit according to claim 2, further comprising:
   a second drive member connected to the first charge member; and
   a third drive member connected to the second charge member and the second drive member.

4. The shutter unit according to claim 3, wherein the first charge member includes a cam gear, and
   wherein the second drive member includes a gear with the same number of teeth as that of the first charge member, and a phase detector configured to detect a phase of the first charge member.

5. The shutter unit according to claim 3, wherein the second charge member includes a cam gear, and
   wherein the third drive member includes a gear with the same number of teeth as that of the second charge member, and a phase detector configured to detect a phase of the second charge member.

6. The shutter unit according to claim 1 further comprising:
   a transmission member configured to transmit a force from the first charge member to the first blade operation member,
   wherein the first charge member charges the first blade operation member via the transmission member, and
   wherein the second charge member directly charges the second blade operation member.

7. The shutter unit according to claim 1, further comprising a driver configured to drive the first charge member and the second charge member.

8. The shutter unit according to claim 1, wherein the first and the second blade operation members are rotatably supported on the base plate.

9. An imaging apparatus comprising a shutter unit,
   wherein the shutter unit includes:
   a base plate having an aperture and to which a first blade member and a second blade member are rotatably attached;
   a first blade operation member movable integrally with the first blade member between a first movement completion position that provides a retreat state where the first blade member retreats from the aperture, and a first movement start position that provides a closed state where the first blade member closes the aperture;
   a second blade operation member movable integrally with the second blade member between a second movement completion position that provides a closed state where the second blade member closes the aperture, and a second movement start position that provides a retreat position where the second blade member retreats from the aperture;
   a first charge member configured to charge the first blade operation member from the first movement completion position to the first movement start position; and a second charge member configured to charge the second blade operation member from the second movement completion position to the second movement start position, wherein the first charge member and the second charge member include coaxially arranged cam gears and are configured to rotate in opposite directions.

\* \* \* \* \*